United States Patent
Tomida et al.

(10) Patent No.: US 11,403,500 B2
(45) Date of Patent: Aug. 2, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Akihiro Tomida, Kanagawa (JP); Naoko Baba, Kanagawa (JP); Yoshinori Nakajima, Kanagawa (JP); Naomi Yamamoto, Kanagawa (JP); Satoshi Wada, Tokyo (JP); Yumi Shimokodachi, Kanagawa (JP); Junichi Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/212,717

(22) Filed: Mar. 25, 2021

(65) Prior Publication Data

US 2021/0312249 A1  Oct. 7, 2021

(30) Foreign Application Priority Data

Apr. 6, 2020  (JP) .............................. JP2020-068219

(51) Int. Cl.
  *G06K 15/10* (2006.01)
  *G06K 15/02* (2006.01)
(52) U.S. Cl.
  CPC ....... *G06K 15/107* (2013.01); *G06K 15/1872* (2013.01)

(58) Field of Classification Search
  CPC .................................................... G06K 15/107
  USPC ......................................................... 358/1.15
  See application file for complete search history.

(56) References Cited

U.S. PATENT DOCUMENTS

2007/0024662 A1* 2/2007 Arazaki ................. B41J 29/393
                                                         347/19
2012/0194594 A1  8/2012 Fujimoto

FOREIGN PATENT DOCUMENTS

JP        2012-144052 A    8/2012

* cited by examiner

*Primary Examiner* — Jacky X Zheng
(74) *Attorney, Agent, or Firm* — Venable LLP

(57) ABSTRACT

First quantization data for printing by the first nozzle group and second quantization data for printing by the second nozzle group are generated based on multi-valued data. By use of mask patterns, first print data and second print data are generated based on the first quantization data and the second quantization data. The first mask pattern for generating first print data and the second mask pattern for generating second print data are formed so as to include a pixel in which printing of a dot is allowed in both and a pixel in which printing of a dot is not allowed in both. The pixel value of each pixel indicated by the multi-valued data has a correlation with the sum of the number of dots indicated by the first print data and the number of dots indicated by the second print data in the area corresponding to each pixel.

19 Claims, 20 Drawing Sheets

FIG.6A

| | | | | | | | |
|---|---|---|---|---|---|---|---|
| A | B | C | D | B | A | D | C |
| C | D | A | B | D | C | B | A |
| B | A | D | C | A | B | C | D |
| D | C | B | A | C | D | A | B |
| C | D | A | B | D | C | B | A |
| A | B | C | D | B | A | D | C |
| D | C | B | A | C | D | A | B |
| B | A | D | C | A | B | C | D |

600 dpi × 600 dpi, 600

| | A | B | C | D |
|---|---|---|---|---|
| M=1 | 0 0 / 1 0 | 0 0 / 0 1 | 1 0 / 0 0 | 0 1 / 0 0 |
| M=2 | 0 1 / 1 0 | 0 0 / 1 1 | 1 0 / 0 1 | 1 1 / 0 0 |
| M=3 | 1 1 / 1 0 | 0 1 / 1 1 | 1 0 / 1 1 | 1 1 / 0 1 |
| M=4 | 1 1 / 1 1 | 1 1 / 1 1 | 1 1 / 1 1 | 1 1 / 1 1 |
| M=5 | 1 1 / 2 1 | 1 1 / 1 2 | 2 1 / 1 1 | 1 2 / 1 1 |
| ⋮ | ⋮ | ⋮ | ⋮ | ⋮ |
| M=12 | 3 3 / 3 3 | 3 3 / 3 3 | 3 3 / 3 3 | 3 3 / 3 3 |

| | A | B | C | D |
|---|---|---|---|---|
| M=1 | 0 1 / 0 0 | 1 0 / 0 0 | 0 0 / 0 1 | 0 0 / 1 0 |
| M=2 | 1 1 / 0 0 | 1 0 / 0 1 | 0 0 / 1 1 | 0 1 / 1 0 |
| M=3 | 1 1 / 0 1 | 1 0 / 1 1 | 0 1 / 1 1 | 1 1 / 1 0 |
| M=4 | 1 1 / 1 1 | 1 1 / 1 1 | 1 1 / 1 1 | 1 1 / 1 1 |
| M=5 | 1 2 / 1 1 | 2 1 / 1 1 | 1 1 / 1 2 | 1 1 / 2 1 |
| ⋮ | ⋮ | ⋮ | ⋮ | ⋮ |
| M=12 | 3 3 / 3 3 | 3 3 / 3 3 | 3 3 / 3 3 | 3 3 / 3 3 |

1200 dpi × 1200 dpi

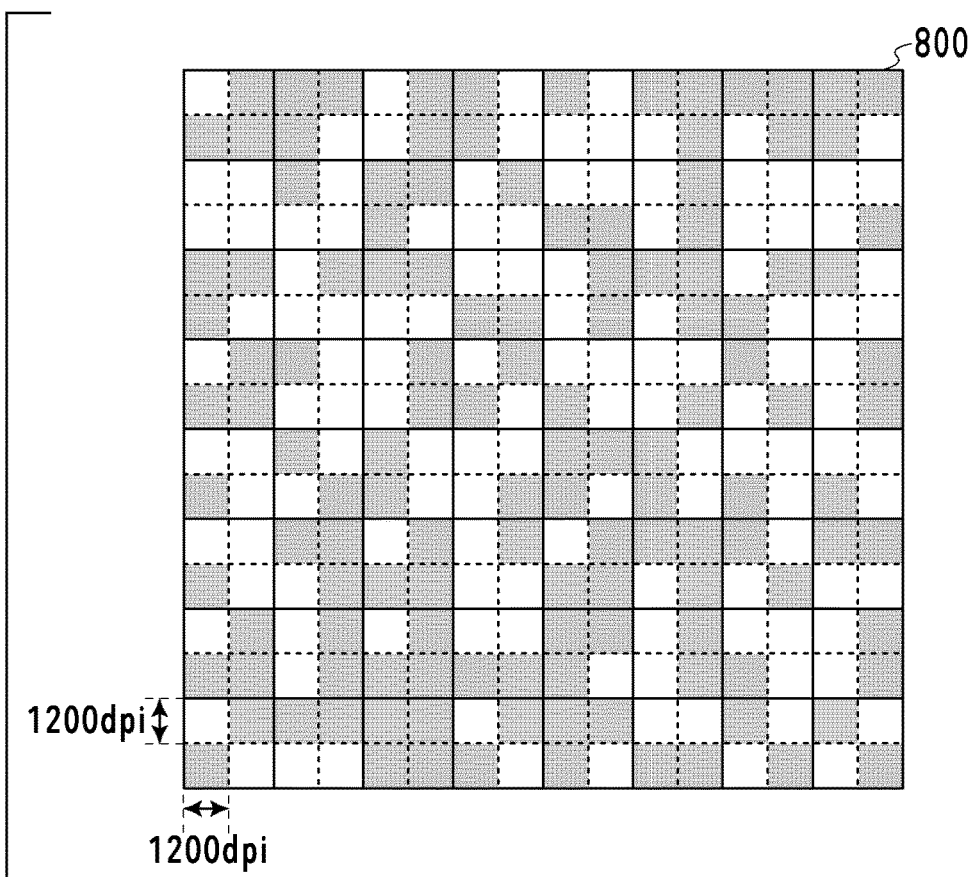
1200dpi
1200dpi
FIG.8
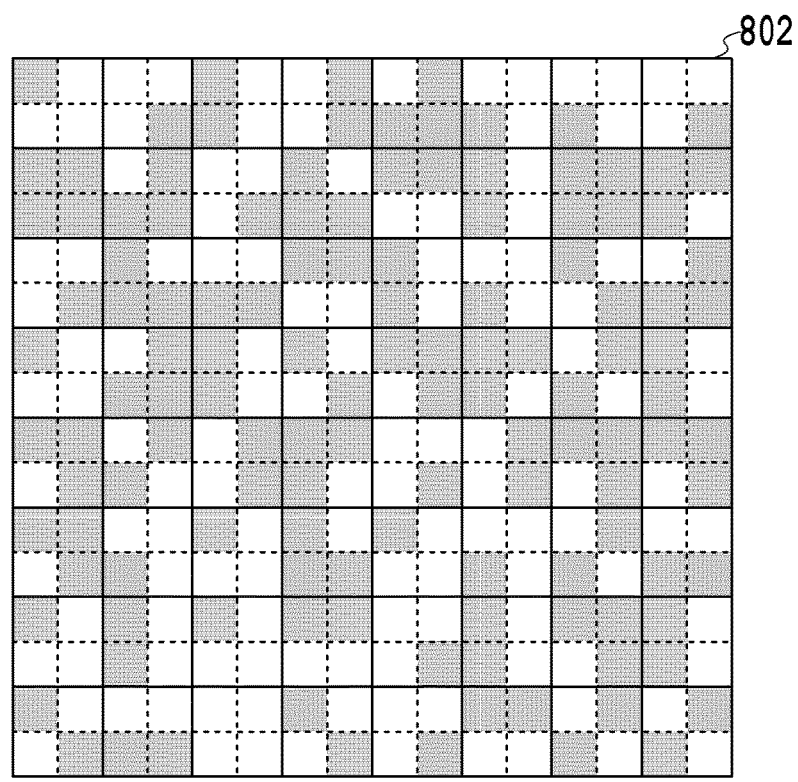

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium for generating print data for printing an image on a relatively-moving print medium by use of multiple nozzle groups.

Description of the Related Art

Regarding a printing apparatus that ejects ink to a print medium in an inkjet system for printing, for example, in order to be capable of high-speed printing, there is a printing method in which the same type of ink is ejected from multiple print heads so that the printable dot number in one scan is increased. Alternatively, there is a printing method, which may be termed as a connecting head, in which multiple nozzle groups are arranged in a partially-overlapping manner in a conveyance direction so that the printing area per one scan is increased.

In a case where the same type of ink is divided for multiple print heads or nozzle groups for performing printing, there is a possibility that the printing positions of the print heads are misaligned due to a factor such as a difference in ink ejection speeds, a fluctuation in the postures of the print heads, a conveyance error of a print medium, or a correction error of a printing position. In a case where such misalignment of the printing positions occurs, image deterioration such as density unevenness, streaks, or deterioration in graininess occurs in the printed image.

In Japanese Patent Laid-Open No. 2012-144052, there is disclosed a technique for improving robustness, which represents resistance to such image deterioration as described above due to misalignment of printing positions. Specifically, in Japanese Patent Laid-Open No. 2012-144052, after input image data is decomposed into ink colors, different parameters are used for multiple print heads at the time of performing multi-value quantization processing in order to generate independent print data, so that robustness to misalignment of the printing positions of the print heads is improved.

However, in the technique disclosed in Japanese Patent Laid-Open No. 2012-144052, multi-value quantization data is created for each print head, and each of the multi-value quantization data is binarized for generating the print data of each print head. Therefore, the amount of intermediate product data is increased, the amount of data processed by the image processing part is increased, and a high-speed processing chip and a memory area are required, which result in cost increase.

SUMMARY OF THE INVENTION

The present invention has been made in view of the above-described problem, so as to provide a technique capable of suppressing the data amount and suppressing density unevenness or the like which is caused by misalignment of the printing positions of nozzle groups in a case where ink of the same color is divided for multiple nozzle groups for printing.

In the first aspect of the present invention, there is provided an image processing apparatus for processing generating print data used for printing an image in a unit area of a print medium by relatively movement between the print medium and each of a first nozzle group and a second nozzle group for ejecting ink of a same color, the image processing apparatus including:

an obtainment unit configured to obtain multi-valued data, which corresponds to ink for printing the image and indicates a value of each pixel with a tone value;

a quantization data generation unit configured to define an arrangement of a plurality of dots corresponding to a tone value of a pixel for each pixel in the multi-valued data, in order to generate first quantization data, which corresponds to a greater pixel count than the multi-valued data and is used for printing by the first nozzle group, and configured to define an arrangement of the plurality of dots corresponding to a tone value of a pixel for each pixel in the multi-valued data so as to be different from the arrangement of dots indicated by the first quantization data, in order to generate second quantization data, which corresponds to a greater pixel count than the multi-valued data and is used for printing by the second nozzle group; and a print data generation unit configured to generate first print data for printing the unit area with the first nozzle group, based on the first quantization data, by use of a first mask pattern in which whether printing of a dot is allowed or not allowed is defined for each pixel of the first quantization data and configured to generate second print data for printing the unit area with the second nozzle group, based on the second quantization data, by use of a second mask pattern in which whether printing of a dot is allowed or not allowed is defined for each pixel of the second quantization data, wherein the first mask pattern and the second mask pattern are formed for quantization data corresponding to the unit area so as to include a pixel for which printing of a dot is allowed in both of the first mask pattern and the second mask pattern and a pixel for which printing of a dot is not allowed in both of the first mask pattern and the second mask pattern, and wherein a sum of a number of dots indicated by the first print data and a number of dots indicated by the second print data in an area corresponding to each pixel in the multi-valued data has a correlation with a pixel value of each pixel indicated by the multi-valued data.

In the second aspect of the present invention, there is provided an image processing method for processing generating print data used for printing an image in a unit area of a print medium by relatively movement between the print medium and each of a first nozzle group and a second nozzle group for ejecting ink of a same color, the image processing method including:

an obtainment step of obtaining multi-valued data, which corresponds to ink for printing the image and indicates a value of each pixel with a tone value;

a quantization data generation step of defining an arrangement of a plurality of dots corresponding to a tone value of a pixel for each pixel in the multi-valued data, in order to generate first quantization data, which corresponds to a greater pixel count than the multi-valued data and is used for printing by the first nozzle group, and for defining an arrangement of the plurality of dots corresponding to a tone value of a pixel for each pixel in the multi-valued data so as to be different from the arrangement of dots indicated by the first quantization data, in order to generate second quantization data, which corresponds to a greater pixel count than the multi-valued data and is used for printing by the second nozzle group; and a print data generation step of generating first print data for printing the unit area with the first nozzle group, based on the first quantization data, by use of a first mask pattern in which whether printing of a dot is allowed or not allowed is defined for each pixel of the first quantization data and for generating second print data for printing the unit area with the second nozzle group, based on the second quantization data, by use of a second mask pattern in which whether printing of a dot is allowed or not allowed is defined for each pixel of the second quantization data, wherein the first mask pattern and the second mask pattern are formed for quantization data corresponding to the unit area so as to include a pixel for which printing of a dot is allowed in both of the first mask pattern and the second mask pattern and a pixel for which printing of a dot is not allowed in both of the first mask pattern and the second mask pattern, and wherein a sum of a number of dots indicated by the first print data and a number of dots indicated by the second print data in an area corresponding to each pixel in the multi-valued data has a correlation with a pixel value of each pixel indicated by the multi-valued data.

In the third aspect of the present invention, there is provided a non-transitory computer readable storage medium storing a program for causing a computer to function as an image processing apparatus for processing generating print data used for printing an image in a unit area of a print medium by relatively movement between the print medium and each of a first nozzle group and a second nozzle group for ejecting ink of a same color, the image processing apparatus including:

an obtainment unit configured to obtain multi-valued data, which corresponds to ink for printing the image and indicates a value of each pixel with a tone value;

a quantization data generation unit configured to define an arrangement of a plurality of dots corresponding to a tone value of a pixel for each pixel in the multi-valued data, in order to generate first quantization data, which corresponds to a greater pixel count than the multi-valued data and is used for printing by the first nozzle group, and configured to define an arrangement of the plurality of dots corresponding to a tone value of a pixel for each pixel in the multi-valued data so as to be different from the arrangement of dots indicated by the first quantization data, in order to generate second quantization data, which corresponds to a greater pixel count than the multi-valued data and is used for printing by the second nozzle group; and a print data generation unit configured to generate first print data for printing the unit area with the first nozzle group, based on the first quantization data, by use of a first mask pattern in which whether printing of a dot is allowed or not allowed is defined for each pixel of the first quantization data and configured to generate second print data for printing the unit area with the second nozzle group, based on the second quantization data, by use of a second mask pattern in which whether printing of a dot is allowed or not allowed is defined for each pixel of the second quantization data, wherein the first mask pattern and the second mask pattern are formed for quantization data corresponding to the unit area so as to include a pixel for which printing of a dot is allowed in both of the first mask pattern and the second mask pattern and a pixel for which printing of a dot is not allowed in both of the first mask pattern and the second mask pattern, and wherein a sum of a number of dots indicated by the first print data and a number of dots indicated by the second print data in an area corresponding to each pixel in the multi-valued data has a correlation with a pixel value of each pixel indicated by the multi-valued data.

According to the present invention, in a case where print data is divided for multiple nozzle groups that eject ink of the same color for printing, the data amount can be suppressed, and density unevenness or the like which is caused by misalignment of the printing positions of the nozzle groups can be suppressed.

Further features of the present invention will become apparent from the following description of exemplary embodiments with reference to the attached drawings.

BRIEF DESCRIPTION OF THE DRAWINGS

FIG. 6A to FIG. 6C are diagrams illustrating an example of distribution patterns;

FIG. 8 is a diagram illustrating mask patterns used in the image data processing according to the comparative example;

FIG. 17A and FIG. 17B are diagrams illustrating a modification example of distribution patterns;

DESCRIPTION OF THE EMBODIMENTS

Hereinafter, with reference to the accompanying drawings, a detailed explanation is given of an example of embodiments of an image processing apparatus, an image processing method, and a storage medium. Note that it is not intended that the following embodiments limit the present invention, and every combination of the characteristics explained in the present embodiments is not necessarily essential to the solution in the present invention. In addition, the relative positions, shapes, etc., of the constituent elements described in the embodiments are merely examples and are not intended to limit this invention to the range of the examples.

First Embodiment

Figure 1:
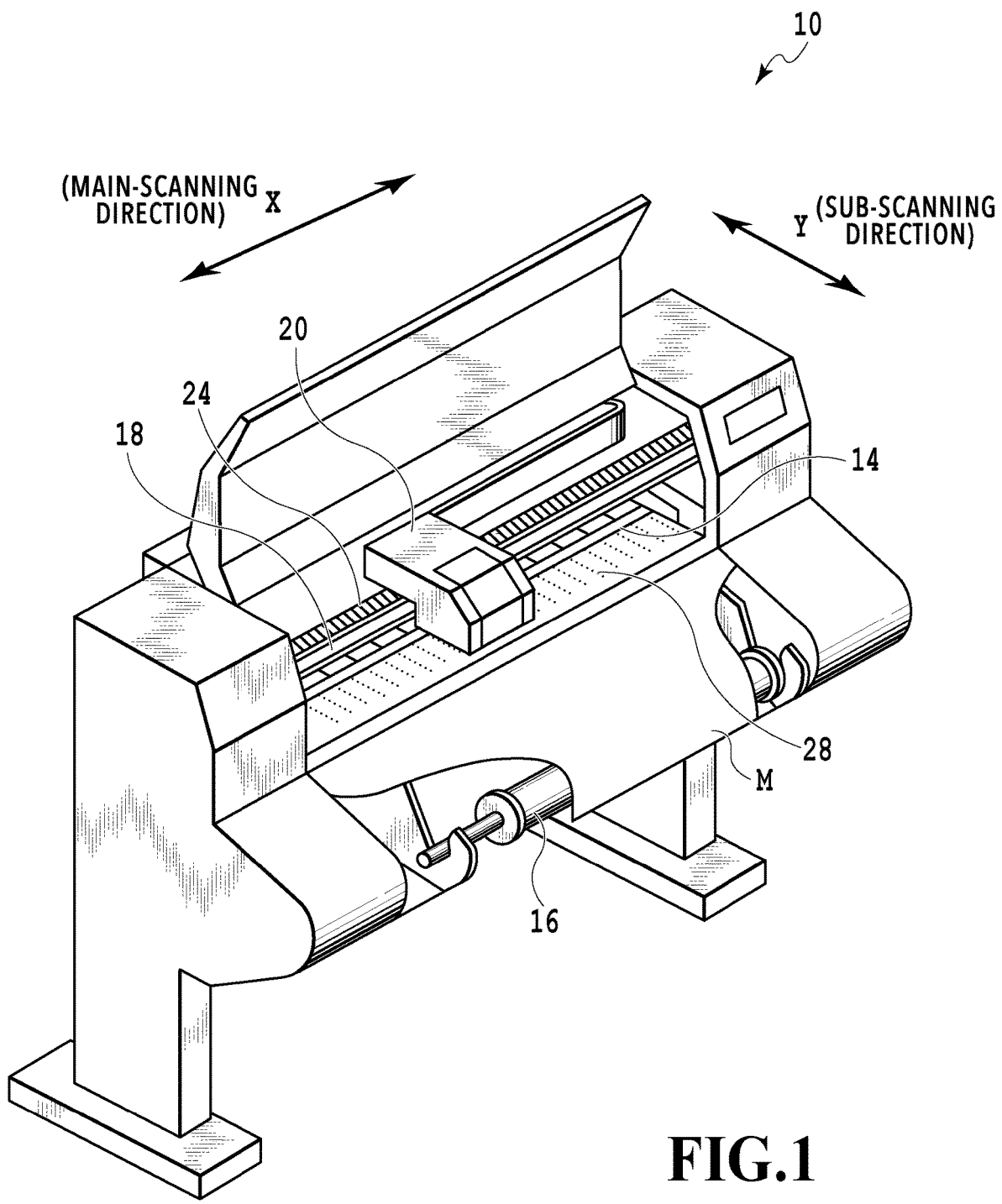
FIG. 1 is a schematic configuration diagram of a printing apparatus including an image processing apparatus according to an embodiment.
Figure 2:
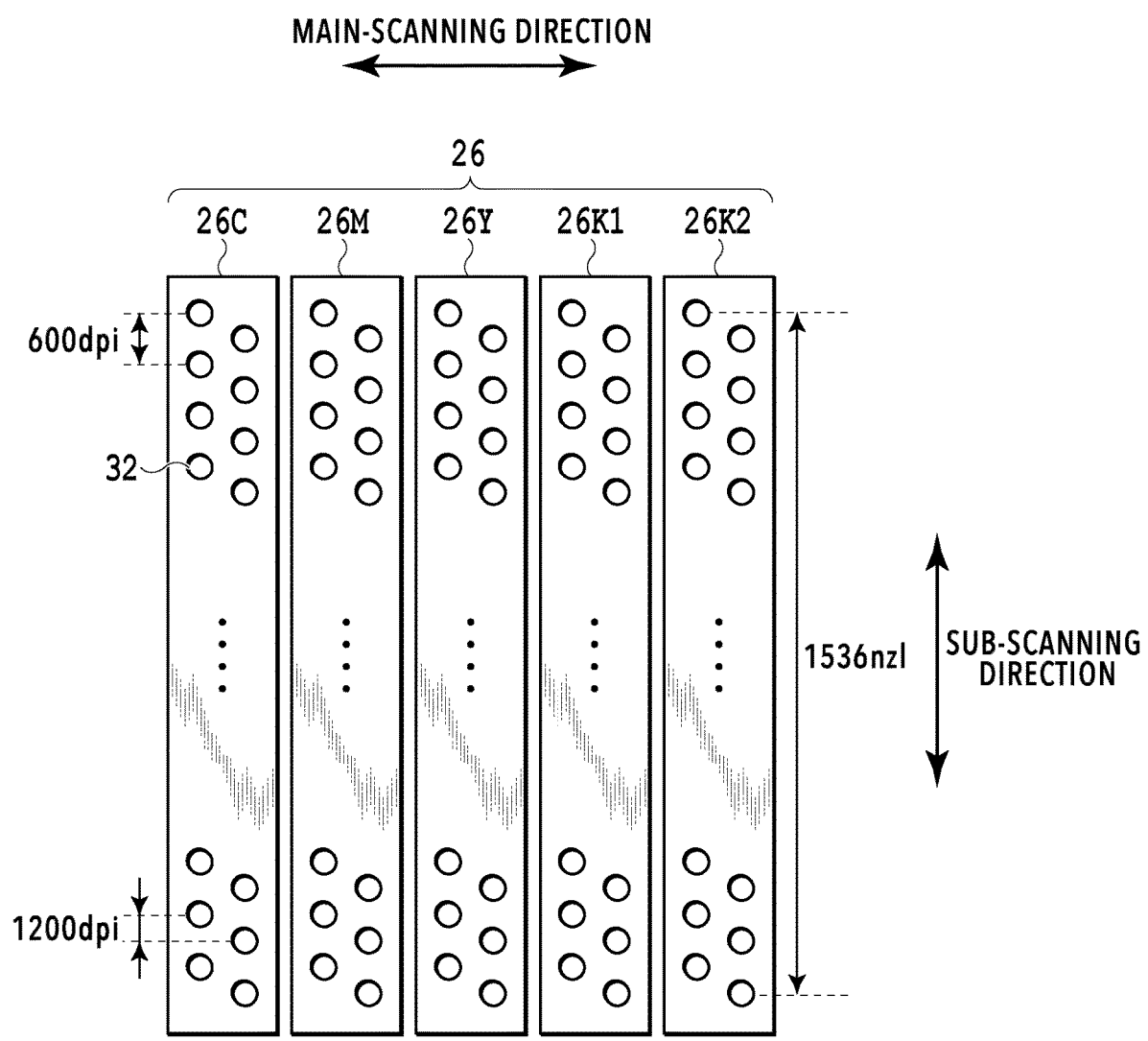
FIG. 2 is a diagram illustrating an example of an arrangement of print heads in the first embodiment.
Figure 3:
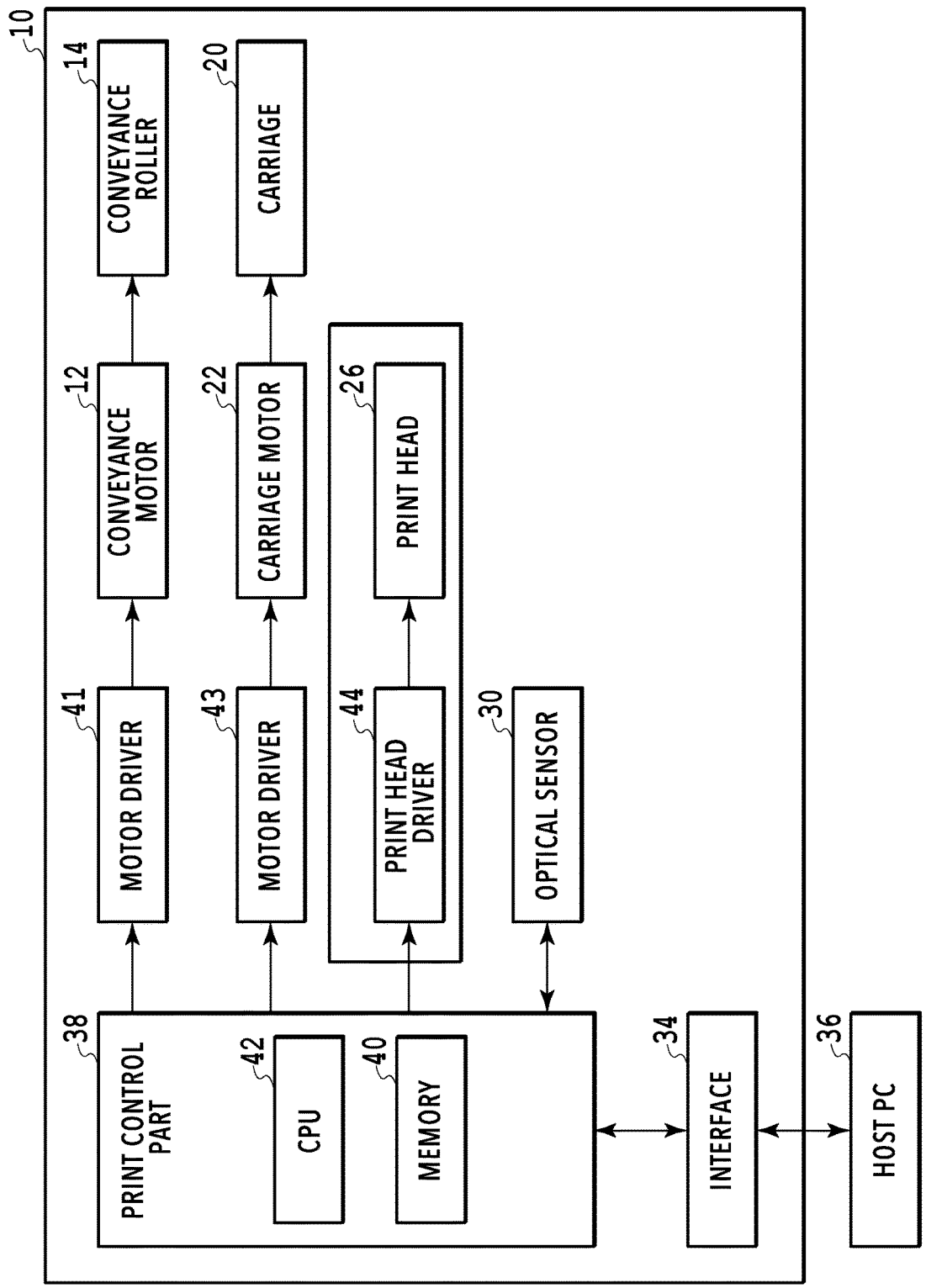
FIG. 3 is a block configuration diagram of a control system of the printing apparatus.

FIG. 1 is a schematic configuration diagram of a printing apparatus including an image processing apparatus according to the present embodiment. FIG. 2 is a diagram illustrating an example of the form of nozzles in a print head. FIG. 3 is a block configuration diagram of a control system of the printing apparatus. The printing apparatus 10 illustrated in FIG. 1 is an inkjet printing apparatus that performs printing on a print medium M by ejecting ink in an inkjet system. Further, the printing apparatus 10 is a serious scan type printing apparatus that conveys the print medium M in the Y direction and performs scanning in the X direction, which intersects the Y direction (orthogonally in the present embodiment), with the print head 26 (described later) that ejects ink, in order to print an image on the print medium M. Note that, in the explanation below, the "Y direction" is appropriately referred to as the "conveyance direction" or the "sub-scanning direction", and the "X direction" is appropriately referred to as the "main-scanning direction".

In the printing apparatus 10, the print medium M held by the spool 16 is conveyed in the Y direction by a conveyance roller 14, which is driven by the conveyance motor 12 (see FIG. 3) via a gear (not illustrated in the drawings). Further, the printing apparatus includes the carriage 20, which is disposed so as to be reciprocally movable on the guide shaft 18 extending along the X direction. This carriage 20 is caused to perform reciprocal movement in the X direction, that is, the main-scanning direction, along the guide shaft 18 by the carriage motor 22 (see FIG. 3). For the transmission of the driving force from the carriage motor 22 to the carriage 20, for example, a carriage belt can be used, and various publicly-known techniques can be applied. Further, on the carriage 20, the optical sensor 30 (see FIG. 3) is mounted at a position that faces the print medium M supported by the platen 28 while moving in the main-scanning direction. The optical sensor 30 reads, for example, a test pattern printed on the print medium M while the carriage 20 moves in the main-scanning direction.

The printing apparatus 10 includes an encoder 24, so as to control the movement of the carriage 20, based on positioning signals obtained by the encoder 24. On the carriage 20, the print head 26 is disposed so as to face the platen 28 that supports the print medium conveyed by the conveyance roller 14 while moving in the main-scanning direction. As will be described in detail later, the print head 26 includes multiple nozzles for ejecting ink.

As illustrated in FIG. 2, on the carriage 20, the print head 26 includes five print heads 26, which are disposed side by side along the main-scanning direction. Specifically, in order from the left in the drawing, the print head 26C that ejects cyan (C) ink, the print head 26M that ejects magenta (M) ink, the print head 26Y that ejects yellow (Y) ink, and the print heads 26K1 and 26K2 that eject black (K) ink are included.

In each print head 26, nozzles 32 for ejecting ink droplets are formed at intervals of 600 dpi along the sub-scanning direction in two rows. These two nozzle rows are formed so that, relative to one nozzle row, the other nozzle row is displaced by 1200 dpi in the sub-scanning direction. Note that, in the present embodiment, each print head 26 has two nozzle rows formed with 1536 nozzles 32.

Both the print head 26K1 and the print head 26K2 can perform printing with K ink, and the printing is performed based on print data divided by use of the later-described mask patterns. Further, with respect to the print heads 26 of the respective ink colors, the nozzle rows match with each other in the sub-scanning direction so that printing can be performed in the same area.

Note that the number of nozzles and the number of nozzle rows in a print head 26, the array order of the print heads 26 in the main-scanning direction, etc., are examples thereof and are not limited to those in the present embodiment. Further, the ink ejected from the print head 26 is not limited to the above-described four colors. Further, although only printing with K ink is performed by the two print heads 26, such a form in which printing with C ink, M ink, and Y ink are performed by two print heads 26 as well is also possible.

Such a form in which ink is supplied to the print head 26 from an ink tank mounted on the carriage 20 and such a form in which ink is supplied to the print head 26 from an ink tank mounted inside the printing apparatus 10 via a tube or the like are both also possible. Further, in a case of a form in which an ink tank is mounted on the carriage 20, such a configuration in which the ink tank and the print head 26 are mounted on the carriage in a demountable manner and such a configuration in which a cartridge including the ink tank integrated with the print head 26 is mounted on the carriage 20 are both also possible. Note that, although the print heads 26 are disposed separately for the respective ink colors in the present embodiment, the present embodiment is not limited as such, and it is also possible that the print head 26 is a multiple-color integrated type, which is capable of ejecting multiple colors of ink.

As illustrated in FIG. 3, the printing apparatus 10 is connected to a data supply device such as the host computer (hereinafter also referred to as a "host PC") 36 via the interface 34. Various kinds of data transmitted from the host PC 36, control signals related to printing, etc., are input to the print control part 38 of the printing apparatus 10. For example, a printer driver for driving the printing apparatus 10 is installed in the host PC 36.

The print control part 38 includes a memory 40, which stores input image data, multi-value tone data as an intermediate product, and the later-described mask patterns, and the CPU 42, which is a control calculation device. Further, the print control part 38 controls the operation of the conveyance roller 14, the carriage 20, etc., via various kinds of drivers according to control signals that are input via the interface 34. Moreover, the print control part 38 performs processing of input image data, processing of detection signals from the optical sensor 30, processing of signals that are input via a head identifying signal generating circuit (not illustrated in the drawings), etc. Note that the head identifying signal generating circuit is configured to supply a signal indicating the type and number of print heads 26 mounted on the carriage 20 to the print control part 38.

For example, the optical sensor 30 is capable of detecting the light and shadow of an image on the print medium M and can be configured with one or an array of multiple photodiodes arranged in the array direction of the nozzle rows, that is, the sub-scanning direction. Further, the conveyance motor 12 is a motor that rotationally drives the conveyance roller 14 for conveying the print medium M, and the drive thereof is controlled by the print control part 38 via the motor driver 41. The carriage motor 22 is a motor for reciprocally moving the carriage 20 in the main-scanning direction, and the drive thereof is controlled by the print control part 38 via the motor driver 43. The print head 26 is controlled by the print control part 38 via the print head driver 44. Note that the print head driver 44 is disposed for each print head 26.

In the printing apparatus 10 having such a configuration, the print medium M fed from the spool 16 is nipped and fed by a feeder roller (not illustrated in the drawings) and a pinch roller (not illustrated in the drawings). Thereafter, the fed print medium M is conveyed by the conveyance roller 14 and guided to the printing position on the platen 28, that is, the scanning area of the print head 26. Then, the printing apparatus 10 performs a printing operation in which ink is ejected to the print medium M that is fed and supported by the platen 28 from the nozzles of the print head 26 while moving in the main-scanning direction via the carriage 20. Then, after performing a conveyance operation in which the print medium M is conveyed by the conveyance roller 14, the printing operation is performed again. In this way, in the printing apparatus 10, such a printing operation and a conveyance operation are alternately and repeatedly executed for performing printing in a unit area by one or multiple times of scans, so that an image is printed on the print medium M.

The printing apparatus 10 generates print data which represents whether or not ink is ejected from a nozzle 32 of each print head 26, based on the image data of the image to be printed, which is input from the host PC 36 or the like. Note that the processing for such image data is executed by the print control part 38. Note that, in the printing apparatus 10, print data of each color is generated in the image data processing. Further, in the configuration of the printing apparatus 10, K ink is ejected from two nozzle groups of the print heads 26K1 and 26K2. Therefore, as for K ink, print data is generated for each nozzle group of the print head 26K1 and the print head 26K2. Note that, in the present embodiment, an explanation will be given of a case in which the print head 26K1 and the print head 26K2 perform printing in the same area by one scan.

Figure 4:
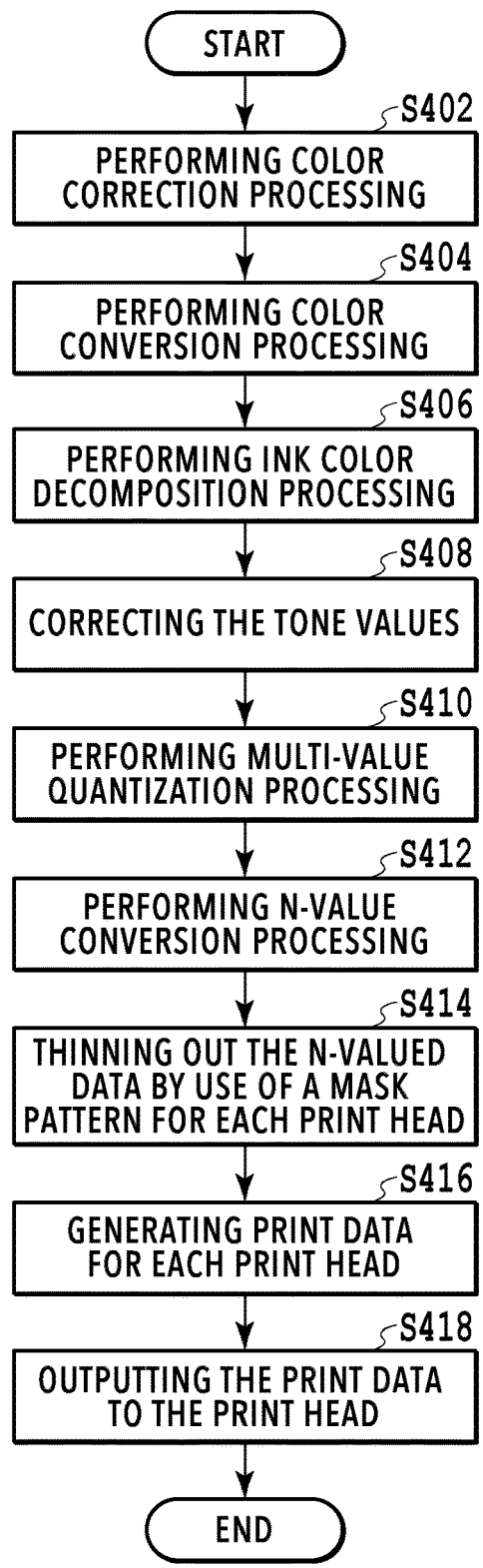
FIG. 4 is a flowchart illustrating the details of image data processing according to a comparative example.
Figure 5:
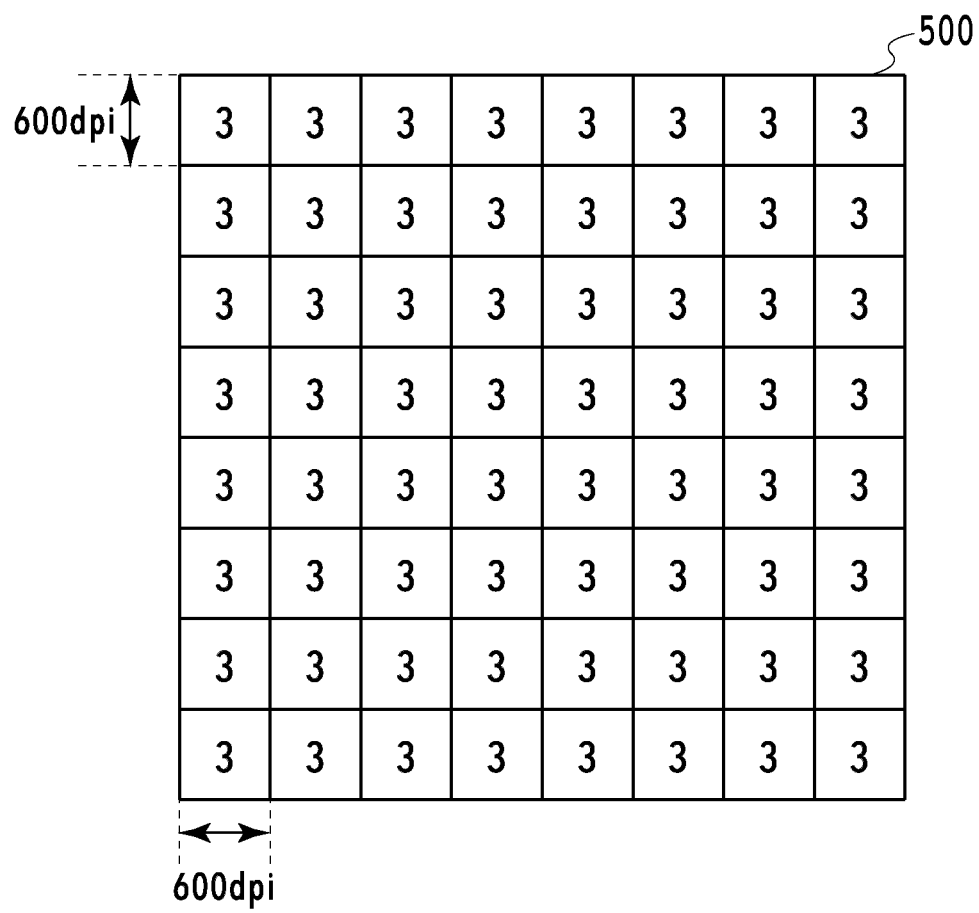
FIG. 5 is a diagram illustrating an example of multi-value quantization data.

Here, the image data processing as a comparative example for the image data processing executed by a printing apparatus including the image processing apparatus according to the present embodiment (hereinafter appropriately referred to as "image data processing according to the present embodiment") will be explained with reference to FIG. 4 to FIG. 9B. FIG. 4 is a flowchart illustrating the details of the image data processing as the comparative example. Note that the sign "S" in the explanation of each process means that it is a step of the flowchart. FIG. 5 is a diagram illustrating an example of multi-value quantization data. FIG. 6A is a diagram illustrating an example of a correspondence table in which a distribution table is associated with each pixel. FIG. 6B is a diagram illustrating an example of a distribution pattern. FIG. 6C is a diagram illustrating an example of a distribution pattern different from FIG. 6B.

Figure 7:
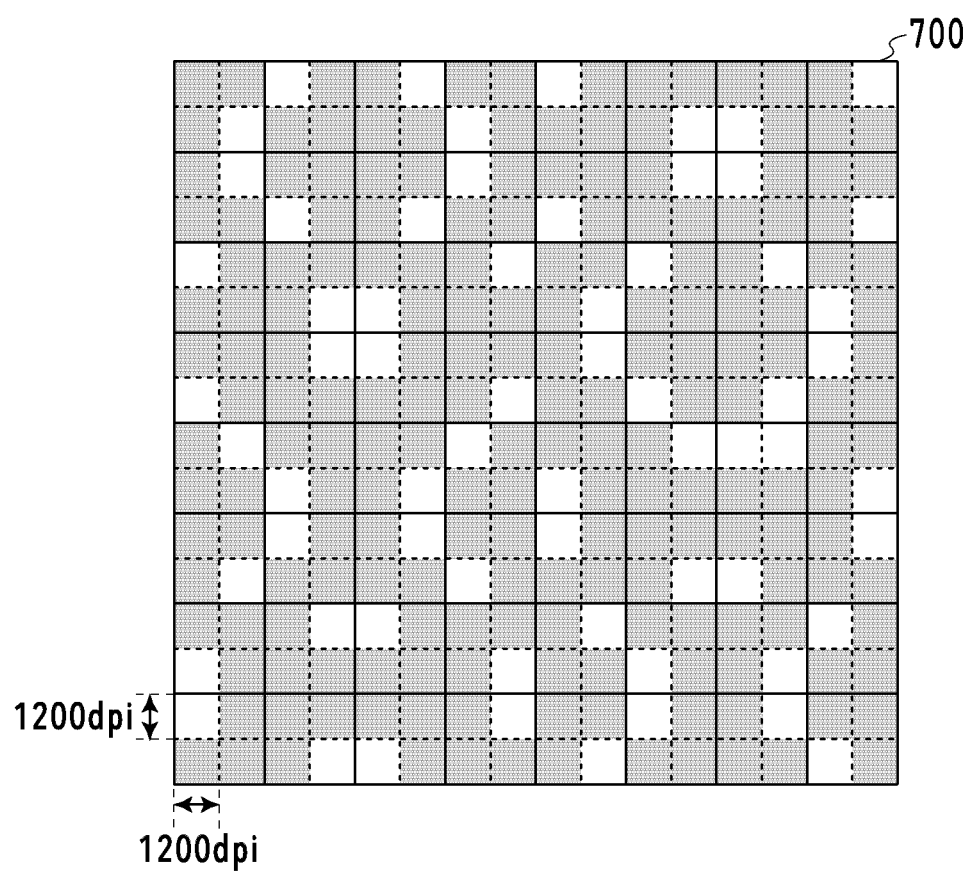
FIG. 7 is a diagram illustrating N-valued data generated in the image data processing according to the comparative example.
Figure 9A:
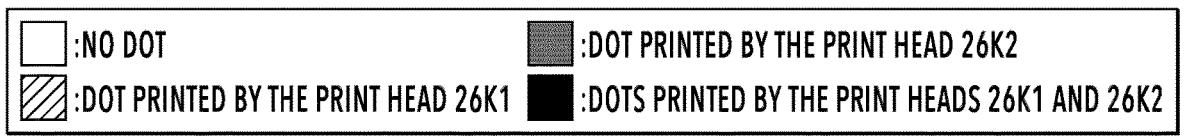
FIG. 9A and FIG. 9B are diagrams illustrating output images printed based on generated print data.
Figure 9A:
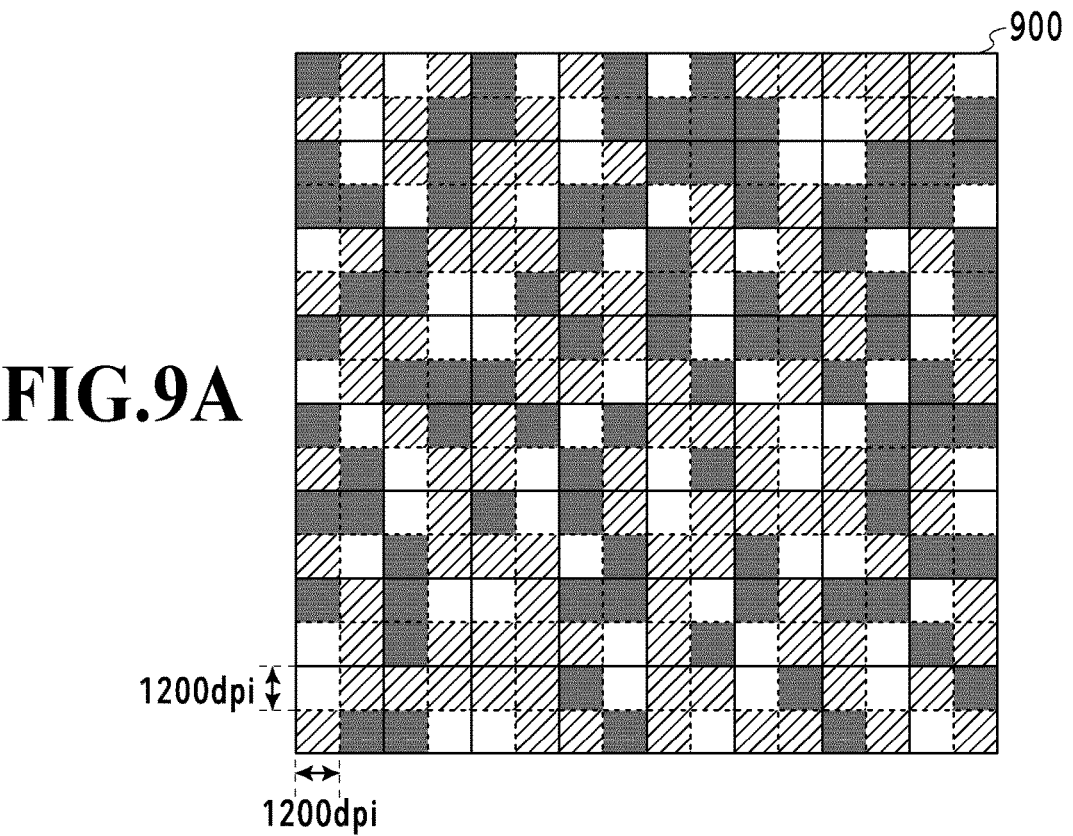
Figure 9B:
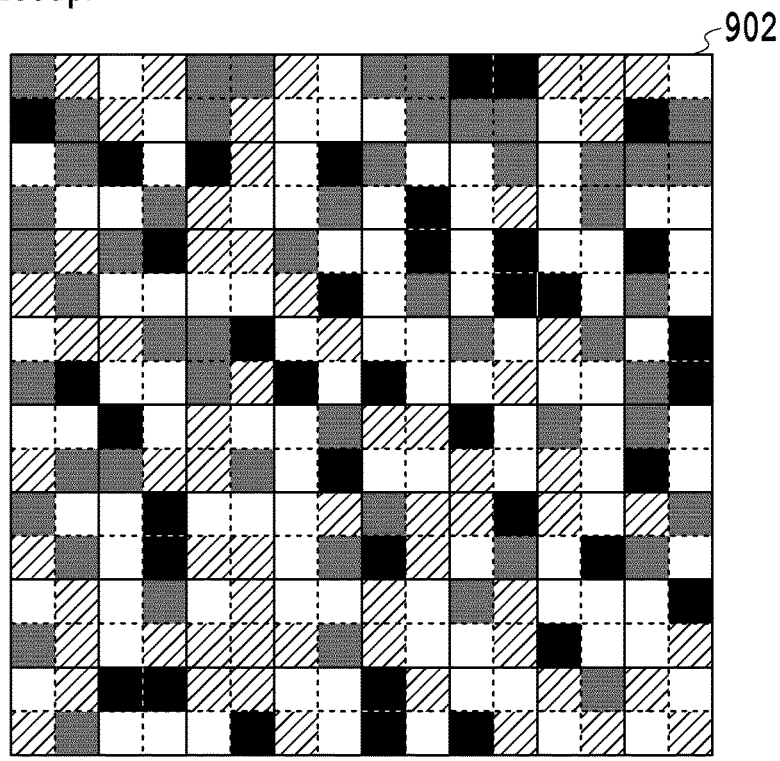

FIG. 7 is a diagram illustrating an example of N-valued data generated in the image data processing according to the comparative example. FIG. 8 is a diagram illustrating an example of mask patterns used in the image data processing according to the comparative example. FIG. 9A is an output image in a case where misalignment of printing positions has not occurred for print heads 26 that eject ink of the same color, and FIG. 9B is an output image in a case where the misalignment of printing positions has occurred.

The image data processing according to the comparative example is executed by the print control part 38 in a case where the printing apparatus receives a print instruction. Regarding this image data processing, for ease of understanding, an explanation will be given of a case where print data for two print heads 26K1 and 26K2 that eject K ink is generated.

Upon starting the image data processing according to the comparative example, firstly, via the interface 34, color correction processing is performed on image data (RGB 8 bits) transmitted from the host PC 36 and the corrected image data is held in the memory 40 (S402). Next, color conversion processing is performed so as to convert the input image data into CMYK 8-bit data (S404). Thereafter, ink color decomposition processing is performed so as to convert the CMYK data into 8-bit data corresponding to the printing ratio of each ink color (S406), and tone correction processing is performed so as to correct the output characteristics for the input tone values (S408). In the printing apparatus 10, since the ink colors correspond to CMYK, the size of the data is not changed because of the input and output in this processing. Note that it is also possible to generate a larger amount of data as output data, compared to input data, such as light-color ink (photo cyan, photo magenta, gray, photo gray), particular color RGB ink, and clear ink.

Next, multi-value quantization processing is performed on the generated 8-bit data for K ink so as to convert the 8-bit data into multi-value quantization data of M values (S410). "M" represents the number of dots to be printed inside one pixel at the resolution of the multi-value quantization data. The following explanation is given on the premise that the resolution of the multi-value quantization data is 600 dpi and M is 12. Note that the resolution of the multi-value quantization data is also referred to as "quantization resolution". As for the specific processing method for the multi-value quantization processing, various publicly-known techniques can be used, and, for example, an error diffusion method, a dither method, etc., can be used. Note that, in a case of a print head with which multiple ink ejection amounts can be selected, an M value represents the ink application amount in one pixel at the resolution of the multi-value quantization data and can be the total value of the ink application amounts of dots with different ejection amounts.

Thereafter, N-value conversion processing is performed so as to quantize the multi-value quantization data, which has been quantized into M values, into N values for correspondence to the resolution of the print head 26 (S412). "N" is a natural number that is 1 or higher and M or lower. The N-valued multiplexed quantum data (hereinafter appropriately referred to as "N-valued data") is data indicating whether or not printing is performed in the corresponding pixel at a resolution of 1200 dpi, which corresponds to the nozzle pitch of the print head 26. Note that the resolution corresponding to the nozzle pitch of the print head 26, that is, the distance between nozzles in the sub-scanning direction, is also referred to as the "print resolution". Therefore, in this case, since the dots are distributed to four times as many pixel counts as one pixel of the multi-value quantization data (resolution 600 dpi) of an M value, N is 3 (M/4), so that print data for printing three dots at most in each pixel of 1200 dpi will be generated.

Here, it is assumed that, as illustrated in FIG. 5, there is image data of which the multi-value quantization data 500 has a quantization resolution of 600 dpi and each pixel value (also referred to as a tone value) is "3". In this case, in S412, for the multi-value quantization data illustrated in FIG. 5, the N-valued data with a print resolution of 1200 dpi is generated by use of distribution patterns as illustrated in FIG. 6A to FIG. 6C. Note that, in the present specification, for ease of understanding, a case in which print data is generated in N-value conversion processing for converting multi-value quantization data of 600 dpi and 8×8 pixels into N values will be explained.

In FIG. 6A, the correspondence table 600 in which a pattern group is associated with each pixel of 600 dpi is illustrated. Four types of pattern groups A, B, C, and D are associated with respective pixels in the correspondence table 600. For these pattern groups, as illustrated in FIG. 6B and FIG. 6C, a pattern is set in the distribution patterns group Gr1 and group Gr2 according to each tone value. Note that the patterns corresponding to tone values other than "4", "8", and "12" are different between the group Gr1 and group Gr2. In the correspondence table 600, the pattern groups A through D are offset so that the same pattern is not repeated. Since M is 12 in the present embodiment and the comparative example, each distribution pattern includes 12 patterns up to M=12 of which tone values are all "3".

Note that in a case where the size of the image data is larger than that of the correspondence table 600 of 8×8 pixels, the arrangements of the pattern groups A through D of the correspondence table 600 are offset for an adjacent 8×8 pixel areas. Accordingly, it is possible to prevent texture generated by repeating the same pattern.

In S412, N-valued data is generated for the multi-value quantization data obtained in S410 by use of the group Gr1 based on the correspondence table 600. That is, in S412, the group Gr2 illustrated in FIG. 6C is not used. For example, in a case of such multi-value quantization data 500 having tone values of M=3 as illustrated in FIG. 5, for the upper leftmost pixel, the pattern group A which is associated with the upper leftmost pixel of the correspondence table 600 is selected. That is, for the upper leftmost pixel, by use of the pattern of M=3 in the pattern group A of the group Gr1, out of the pixels obtained by dividing the pixel of 600 dpi, which is the quantization resolution, into 2×2, the tone value of the bottom right pixel is "0", and the tone values of the other pixels are "1". In this way, in the data of each pixel after the N-value conversion processing, the tone values of three pixels in the unit of 600 dpi are "1", so that the tone value "3" of the multi-value quantization data is maintained. If the N-value conversion processing is performed in this way, the N-valued data 700 illustrated in FIG. 7 is generated. In this N-valued data 700, it is indicated that the gray pixels are pixels whose tone value has become "1" as a result of the N-value conversion processing and the white pixels are pixels whose tone value has become "0" as a result of the N-value conversion processing.

In this way, upon generation of the N-valued data for the print heads 26K1 and 26K2, next, the N-valued data, which is divided into data for multiple times of scans for printing, is thinned out by use of a mask pattern for data corresponding to one scan (S414). Then, the print data for the print heads 26K1 and 26K2 is generated (S416), and the generated print data is output (S418).

Normally, in a case where data is distributed to multiple print heads 26 by use of mask patterns, the mask patterns for the division is generated so as to be patterns with which dots are exclusively divided into the respective multiple print heads 26, in order to prevent print data from overlapping or being lost. Specifically, such mask patterns 800 and 802 that complement the printing pixels of each other as illustrated in FIG. 8A and FIG. 8B are generated. Therefore, in this comparative example, the mask patterns 800 and 802 are assigned to the print heads 26K1 and 26K2, respectively.

The mask patterns 800 and 802 indicate whether or not printing is allowed in a pixel in a unit of 1200 dpi, that is, whether or not a dot is formed. Further, it is indicated that one dot is formed in gray pixels and no dot is formed in white pixels. The mask patterns illustrated in FIG. 8A and FIG. 8B are formed so as to be selected for use by the two print heads 26K1 and 26K2, respectively. Note that, in the explanation of the present embodiment, a division pattern for a case where print data is divided for multiple scans of the print head 26K1 or 26K2 is not illustrated. However, in a case where printing is performed by multiple scans, by designating a mask pattern for the multiple nozzles of a print head that prints target pixels so that the nozzles to be used for printing are selected, it is possible to divide print data for multiple scans.

Therefore, in S414 and S416, print data is generated from the result of taking the logical product of the N-valued data 700 obtained in S412 and the mask patterns 800 and 802. Then, the generated print data is output to the print head 26 in S418. Depending on the generated print data, the dot positions generated on the print medium are as illustrated in the output image 900 (see FIG. 9A). In the output image 900, based on the print data, the pixels in which printing is performed by the print head 26K1 are indicated with hatching, the pixels in which printing is performed by the print head 26K2 are indicated with gray, and the pixels in which printing is not performed by either of the print heads 26K1 and 26K2 are indicated with white.

By the way, as for printing with the print data generated in the image data processing of this comparative example, in a case where printing positions of multiple print heads that eject ink of the same color are misaligned, the coverage (area factor) of the dots on the print medium greatly varies. Specifically, for example, in a case where the printing position of the print head 26K2 is misaligned with the printing position of the print head 26K1 by one pixel in each of the X direction and the Y direction, the positions of dots generated on the print medium based on the print data are as illustrated in the output image 902 (see FIG. 9B). In the output image 902, the hatched pixels, the gray pixels, and the white pixels are the same as those of the output image 900, and the black pixels indicate the pixels on which printing was performed in an overlapping manner by the print heads 26K1 and 26K2.

In the output image 902, the black pixels in which the printing positions of the print head 26K1 and the print head 26K2 overlap are generated, as compared to the case of the output image 900 in which the printing positions of the print heads 26K1 and 26K2 are not misaligned. Further, the ratio of white pixels in which dots are not formed is increased. Since the density increase rate in a case of being printed in an overlapping manner is lower than a case of being printed on a print medium, that is, a case of being printed without overlapping, the density of the output image 902 in which the printing positions are misaligned is lower than the density of the output image 900 in which the printing positions are not misaligned. Therefore, if the printing positions of the print heads are misaligned inside a scanning area of one scan or multiple scans of the print heads, the density varies depending on areas in the output image, and the density variation is visually recognized as density unevenness, which causes an image failure.

Therefore, in the present embodiment, N-valued data is separately generated with different distribution patterns for multiple print heads that eject ink of the same color. Further, for the generated N-valued data, print data is generated by use of mask patterns that are created so as to maintain the tone values of the multi-value quantization data. Accordingly, variation in the dot overlapping ratio in the output image due to misalignment of printing positions, in other words, variation in a blank ratio, is reduced, so that occurrence of density unevenness is prevented.

Figure 10:
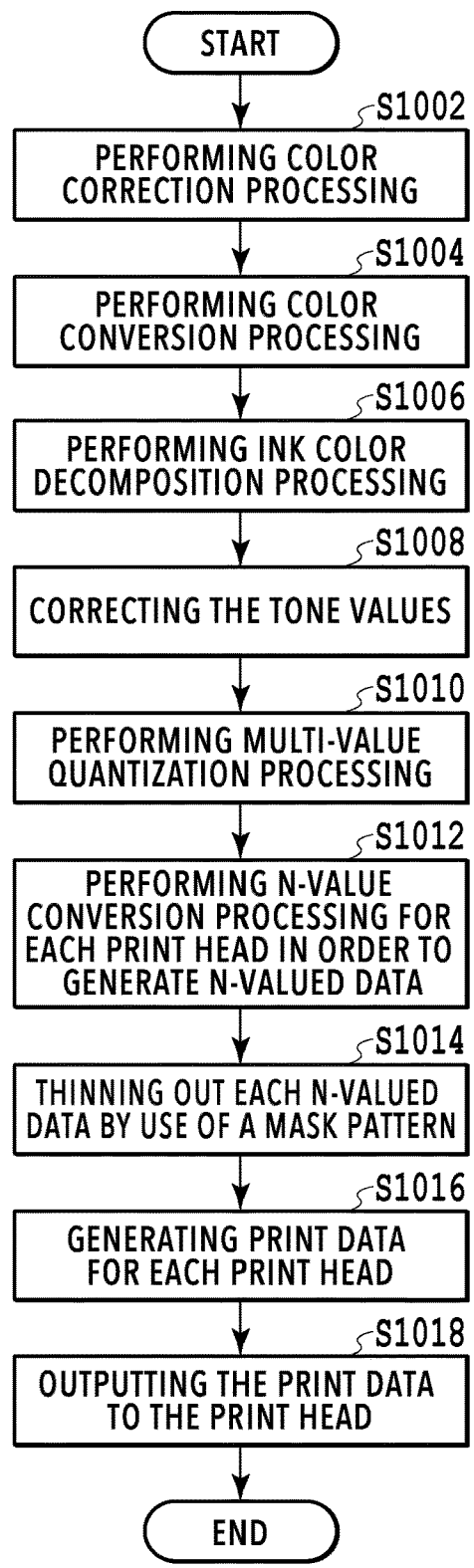
FIG. 10 is a flowchart illustrating the details of image data processing according to the present embodiment.
Figure 11A:
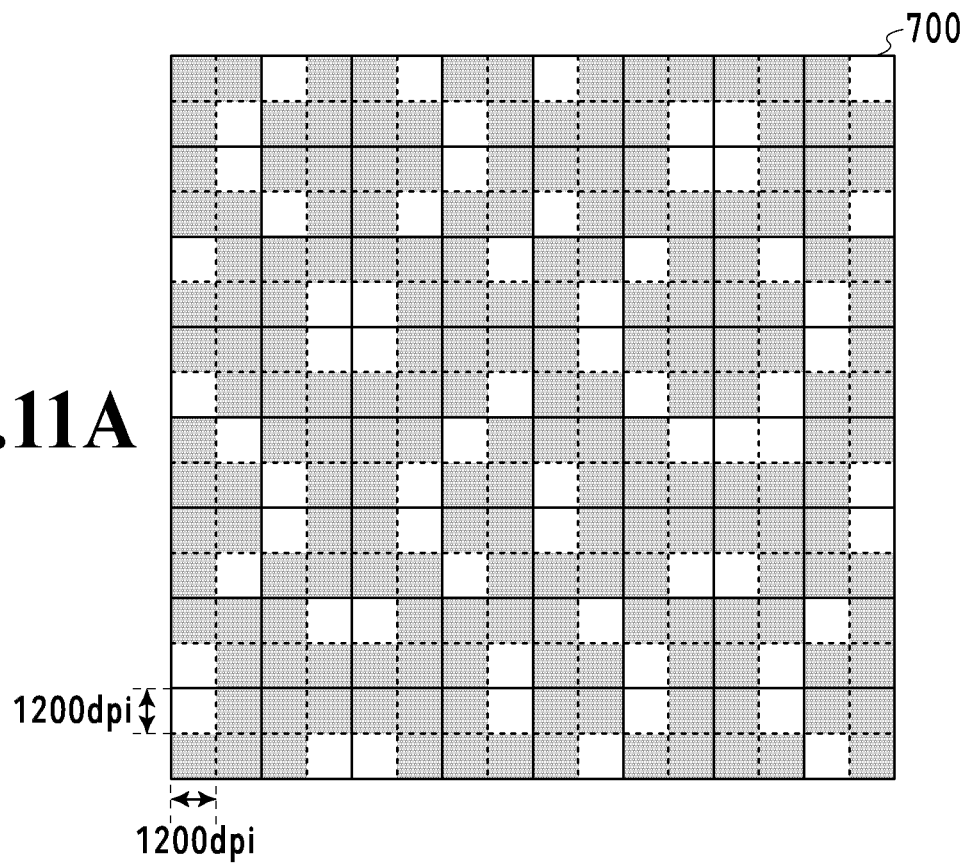
FIG. 11A and FIG. 11B are diagrams illustrating N-valued data generated for respective print heads.
Figure 11B:
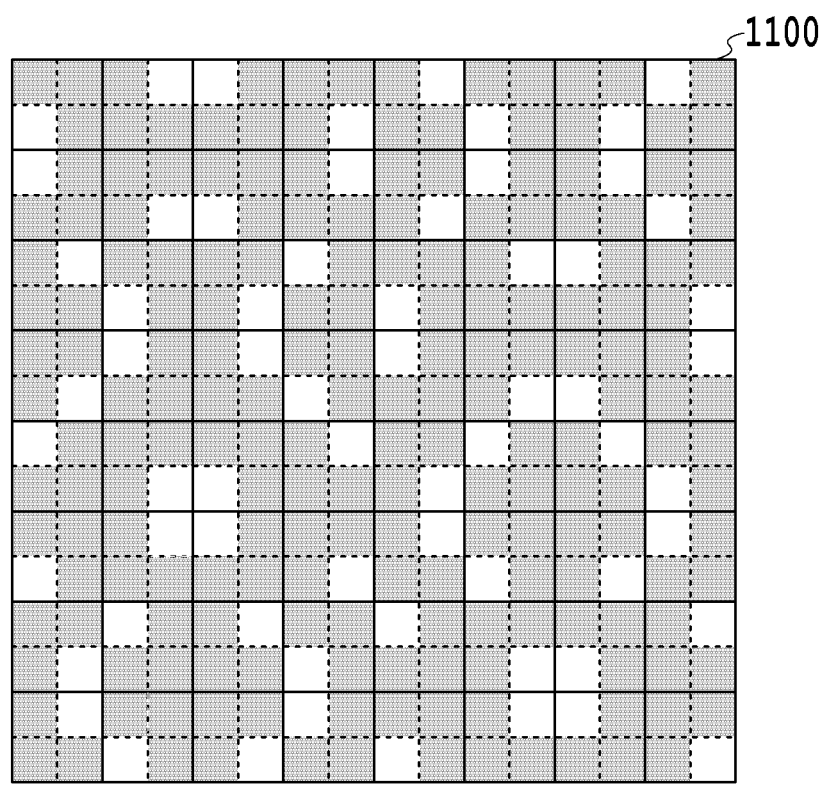
Figure 12:
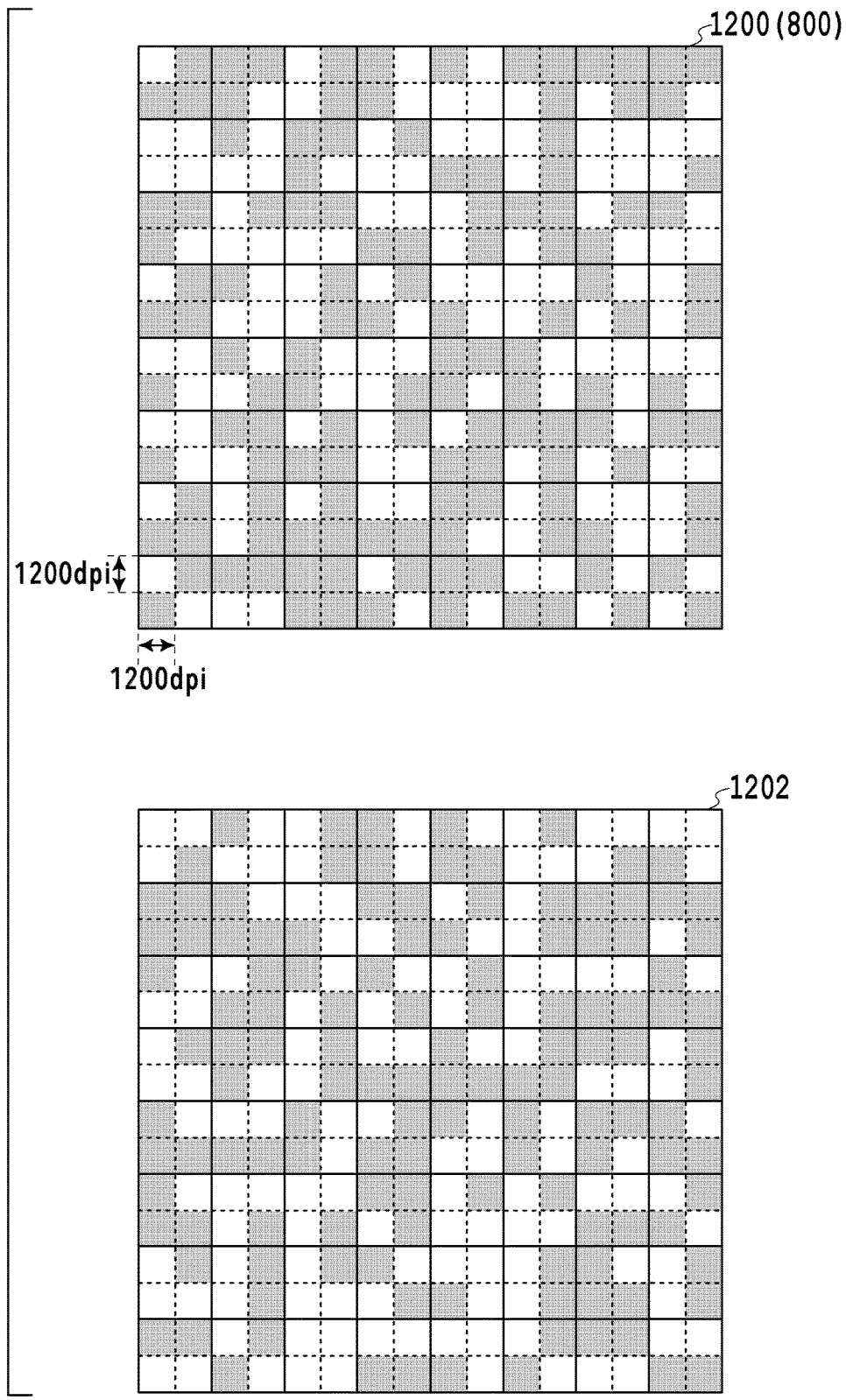
FIG. 12 is a diagram illustrating mask patterns used in the image data processing according to the present embodiment.
Figure 13A:
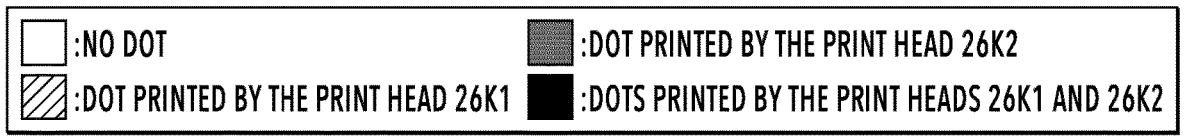
FIG. 13A and FIG. 13B are diagrams illustrating output images printed based on generated print data.
Figure 13A:
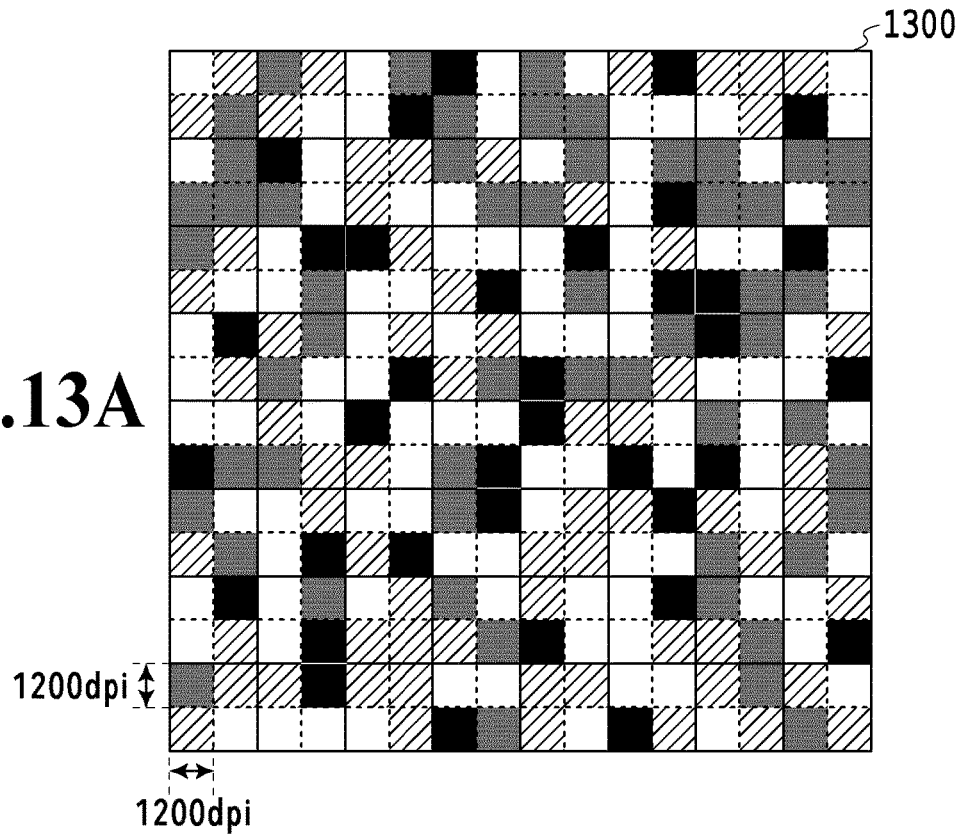
Figure 13B:
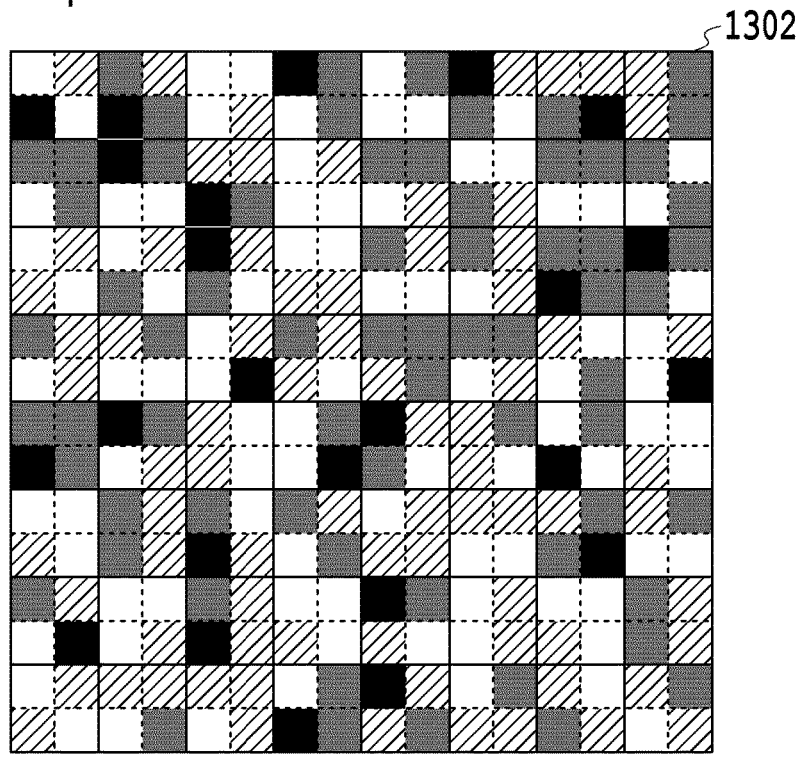

Hereinafter, an explanation will be given of the image data processing according to the present embodiment with reference to FIG. 10 to FIG. 13B. FIG. 10 is a flowchart illustrating the details of the image data processing according to the present embodiment. FIG. 11A and FIG. 11B are diagrams illustrating an example of N-valued data assigned to print heads that eject ink of the same color. FIG. 12 is a diagram illustrating an example of mask patterns used for image data processing according to the present embodiment. FIG. 13A is a diagram illustrating an output image in a case where misalignment of printing positions has not occurred for print heads 26 that eject ink of the same color, and FIG. 13B is a diagram illustrating an output image in a case where the misalignment of printing positions has occurred.

The series of these processes illustrated in the flowchart of FIG. 10 is performed by the CPU 42 loading a program code recorded in the memory 40 and executing the program code. Alternatively, a part or all of the functions in the steps of FIG. 10 may be executed by hardware such as an ASIC or an electronic circuit. The sign "S" in the explanation of each process means that it is a step of the flowchart.

Upon starting the image data processing according to the present embodiment, firstly, color correction is performed on the RGB 8-bit image data transmitted from the host PC 36 (S1002), and, thereafter, color conversion processing is performed so as to convert the image data into CMYK 8-bit data (S1004). Next, ink color decomposition processing is performed so as to convert the CMYK 8-bit data into 8-bit data corresponding to the printing ratio of each ink color (S1006), and tone correction processing is performed so as to correct the output characteristics for the input tone values (S1008). Thereafter, multi-value quantization processing is performed on the generated 8-bit data for each ink color so as to convert the 8-bit data into multi-valued data of M values (S1010). Note that the details of processing from S1002 to S1010 are the same as those from S402 to S410 of the image data processing according to the comparative example. That is, in the present embodiment, the print control part 38 functions as a quantization data generation part that generates multi-value quantization data by quantizing image data representing an image to be printed.

Upon obtaining the multi-value quantization data, next, N-value conversion processing is performed so that N-valued data is separately generated for each of the print heads 26K1 and 26K2 (S1012). That is, in S1012, for the print head 26K1, N-valued data is generated by use of the distribution pattern of the group Gr1 (see FIG. 6B). Further, for the print head 26K2, N-valued data is generated by use of the distribution pattern of the group Gr2 (see FIG. 6C). The details of the distribution pattern of each group Gr will be described later. That is, in the present embodiment, two different distribution patterns are applied to the multi-value quantization data in order to separately generate N-valued data for each of the print heads 26K1 and 26K2.

The N-valued data obtained in S1012 will be the N-valued data 700 (see FIG. 11A) for the print head 26K1 and will be the N-valued data 1100 (see FIG. 11B) for the print head 26K2. As for the N-valued data 1100, if focusing on the upper leftmost 600-dpi pixel, by use of the pattern of M=3 in the pattern group A of the group Gr2, out of the pixels obtained by dividing the pixel into 2×2, the tone value of the bottom left pixel is "0", and the tone values of the other pixels are "1". Note that, since the N-valued data 700 is explained in the comparative example, the explanation will be omitted. As for the N-valued data 700 and 1100, tone value "1" appears in only three pixels per 600 dpi so as to maintain the tone value 3 of the multi-value quantization data. That is, the distribution patterns group Gr1 and group Gr2 are patterns different from each other and such patterns with which variation in the ratio of blank areas is small even in a case where printing positions of multiple nozzle groups that eject the same type of ink are misaligned.

Upon generation of the N-valued data respectively corresponding to the print heads 26K1 and 26K2, next, the respective N-valued data, which are divided into data for multiple times of scans for printing, are thinned out by use of the mask patterns for data corresponding to one scan (S1014). Then, the print data for the print heads 26K1 and 26K2 is generated (1016), and the generated print data is output (S1018).

Here, the positions of the pixels whose tone value is "1" are different between the N-valued data 700 and the N-valued data 1100. Therefore, in S1014, if such mask patterns with which dots are exclusively divided into the respective print heads as illustrated in FIG. 8 are used, the dot number of the output image is not necessarily three dots per 600 dpi as in the tone values of the multi-value quantization data.

Specifically, as for the lower rightmost 600-dpi areas of the N-valued data 700 and 1100, if the N-valued data 700 is thinned out by use of the mask pattern 800, dots are printed in the upper left and lower right two pixels of the 2×2 pixels. Further, if the N-valued data 1100 is thinned out by use of the mask pattern 802, dots are printed in the upper right and lower left two pixels of the 2×2 pixels. Therefore, in the 600-dpi lower rightmost area, printing is performed in all of the 2×2 pixels, that is, four dots are printed, so that the tone value 3 of the multi-value quantization data is not maintained. In this case, the density becomes higher or lower on a per 600 dpi basis, compared to the input image data. For this reason, in the output image, image failures, such as a part of the image being missing, density uniformity being impaired, and graininess being deteriorated, occur.

Therefore, as for the mask patterns used in S1014, such patterns with which the tone values of the multi-value quantization data at the quantization resolution of the multi-value quantization data are maintained to the tone values of the output image are used.

Specifically, as illustrated in FIG. 12, the mask pattern 1200 which is used for thinning out the N-valued data of the print head 26K1 is the same pattern as the mask pattern 800. On the other hand, the mask pattern 1202 which is used for thinning out the N-valued data of the print head 26K2 is not such a pattern with which printing is performed in the non-printing pixels of the mask pattern 1200.

With the print data obtained by thinning out the N-valued data 700 by use of the mask pattern 1200 and the print data obtained by thinning out the N-valued data 1100 by use of the mask pattern 1202, the dot positions at which printing is performed are as shown in the output image 1300 (see FIG. 13A). In the output image 1300, focusing on the dot number in the unit of the resolution 600 dpi of the multi-value quantization data, three dots (including overlapping dots) are always printed in the range of 2×2 pixels of 600 dpi, so that the tone values of the multi-value quantization data are maintained.

Therefore, in the present embodiment, in accordance with the difference in dot positions in 2×2 pixels for which the tone values M are distributed by use of the groups Gr1 and Gr2, which are distribution patterns that are different from each other, the positions of the pixels to be printed that are used for complement are changed by use of the mask patterns 1200 and 1202. Specifically, as for the pixels for which the pattern group A is selected, in a case of M=1, the division by use of the mask patterns is performed so that the lower left pixel in the pattern of the group Gr1 and the upper right pixel in the pattern of the group Gr2 complement each other. Further, in a case of M=2, the division by use of the mask patterns is performed so that the upper right pixel in the pattern of the group Gr1 and the upper left pixel in the pattern of the group Gr2 complement each other. Similarly, as for the other tone values, by setting the positional relationship between pixels that complement each other by use of the mask patterns, the M (tone value) dots can be generated at independent positions for the print heads that eject ink of the same color within the resolution of 600 dpi of the multi-value quantization data.

Note that, as for the patterns of M=4 in the pattern groups A through D of the group Gr1 and group Gr2 illustrated in FIG. 6B and FIG. 6C, although the distribution is evenly performed for the respective pixels so that the tone values of the 2×2 pixels are all "1", the present embodiment is not limited as such. That is, it is also possible that the tone value of one pixel is "2", the tone values of two other pixels are "1", and the tone value of the remaining one pixel is "0", so that the total tone value is "4". Note that the distribution is performed so that the tone value distributed to one pixel does not exceed the maximum tone value ("3" in the present embodiment) of the N-value conversion processing.

Additionally, although the tone values of the 2×2 pixels are all "1" in the patterns of M=4, even if printing is performed with print data obtained by thinning out N-valued data with the mask patterns in the present embodiment, such data with which one dot is printed in each pixel is not obtained. This is because, since the pixel positions of the patterns having a complementary relationship are different in the cases of M=1 to 3, the complementary pixel positions of the patterns are also different in the case of M=4, and, even by use of the mask patterns, dots may be generated by the respective print heads 26 in the same pixel of the output image.

In this way, the N-valued data that is separately generated for the print heads 26K1 and 26K2 by use of the distribution patterns is thinned out by use of such mask patterns with which dots to be printed are not exclusively divided and with which the tone values of the multi-value quantization data are maintained in the output image, and thereby the print data is generated. That is, the distribution patterns group Gr1 and group Gr2 and the mask patterns 1200 and 1202 are formed so that the tone value of a pixel in the multi-value quantization data matches the sum of the dot number indicated by print data, which is separately generated for a nozzle group, in the area corresponding to the pixel. Note that, in a case where the print heads are configured so that the ink ejection amounts can be selected, the tone value of a pixel in the multi-value quantization data and the sum of the dot number in the area corresponding to the pixel are formed so as to have a correlation in which the ink application amounts for the pixel match each other. Accordingly, in the output image obtained by printing the generated print data, even in a case where the printing positions of the print heads 26K1 and 26K2 are misaligned, the variation of the area factor is suppressed.

That is, in a case where the printing positions of the print heads 26K1 and 26K2 are not misaligned, the output image to be printed based on the print data generated in the image data processing according to the present embodiment is the output image 1300. On the other hand, in a case where the printing positions of the print head 26K2 is misaligned by one pixel in each of the X direction and the Y direction, the output image is the output image 1302. The difference in the blank ratios of these output image 1300 and output image 1302 is smaller than the difference in the blank ratios of the output image 900 and output image 902 of the comparative example. That is, as illustrated in FIG. 9A and FIG. 9B, as for the output image based on the print data obtained in the image data processing of the comparative example, in a case where the printing positions of the print heads 26K1 and 26K are misaligned, the change in the ratio of the blank area, in which dots are not formed, to the output image is large. On the other hand, as illustrated in FIG. 13A and FIG. 13B, as for the output image based on the print data obtained in the image data processing of the present embodiment, even in a case where the printing positions of the print heads 26K1 and 26K are misaligned, the change in the ratio of the blank area to the output image is small.

Figure 14:
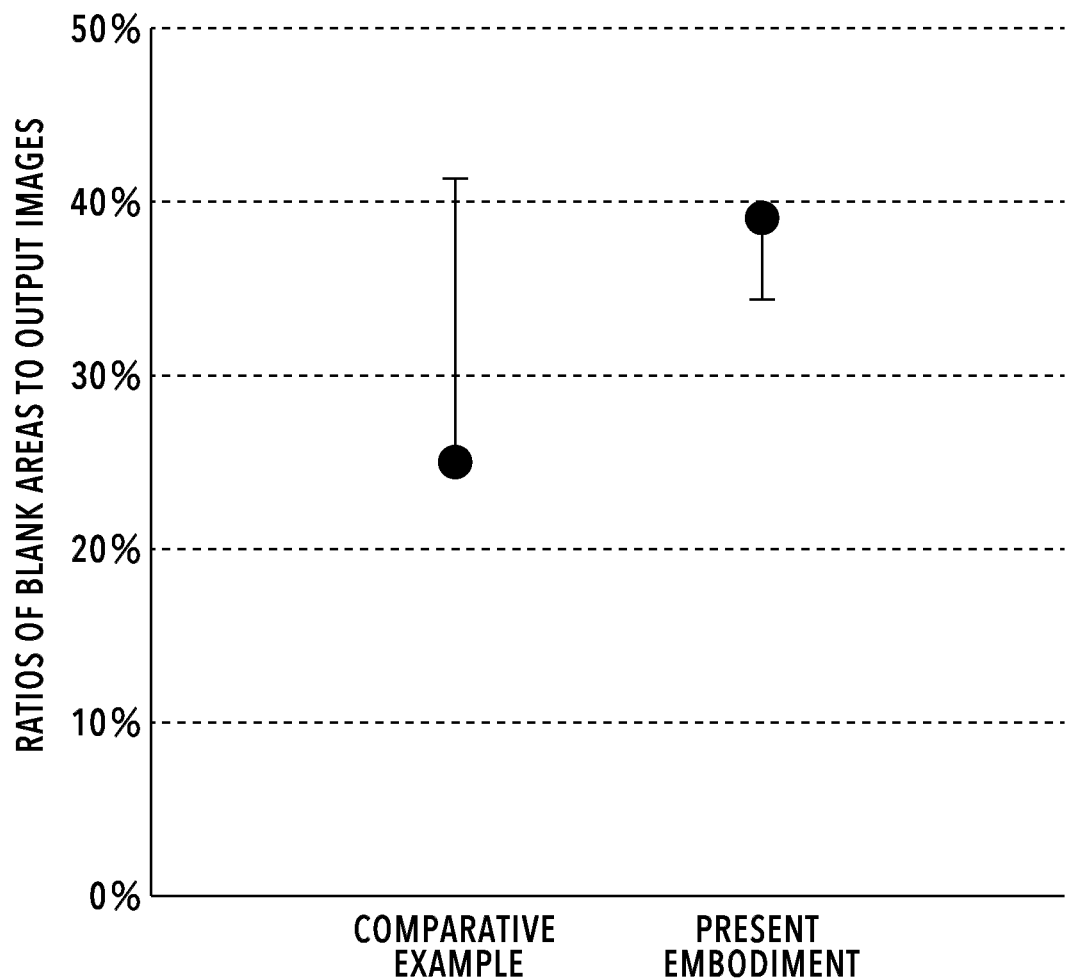
FIG. 14 is a diagram illustrating changes in the ratios of blank areas in the output images in a case where printing positions are misaligned.

FIG. 14 is a graph illustrating blank ratios representing the ratios of pixels in which dots are not formed in the output images based on print data generated in the image data processing of the comparative example and the present embodiment. In FIG. 14, the black dots represent the ratios of the blank areas in the output images in a case where the printing positions of the print heads that eject ink of the same color are not misaligned. Further, in FIG. 14, the error bars represent the variation amounts in the ratios of the blank areas in the output images in a case where the printing positions of the print heads that eject ink of the same color are misaligned by ±1 pixel in both of the X direction and Y direction.

As described above, in the comparative example, if the printing positions are not misaligned, all the dots are exclusively arranged, so that the blank area is 25% in the case of M=3. Further, in the comparative example, in a case where the printing positions are misaligned, pixels with overlapping dots are generated, so that the ratio of the blank area is increased. On the other hand, in the present embodiment, in a case where the printing positions are not misaligned, pixels with overlapped dots are generated, so that the blank ratio is higher as compared to the comparative example. However, in the present embodiment, in a case where the printing positions are misaligned, pixels with overlapped dots and pixels in which overlapped dots are misaligned are generated. Therefore, even thought the printing positions are misaligned, the variation in the ratio of the blank area becomes smaller as compared to the comparative example. Therefore, in the print data generated by the image data processing according to the present embodiment, even in a case where the printing positions of the print heads that eject ink of the same color are misaligned, the density variation of the output image is small. Therefore, in the output image, the density unevenness is not conspicuous and image failures are less likely to occur.

Note that, in the present embodiment, a distribution pattern and a mask pattern must be assigned to the corresponding pixels. Specifically, as illustrated in FIG. 6A to FIG. 6C, in a case where the correspondence table 600 is designated as 600-dpi 8×8 pixels, if the N-value conversion processing is performed on a large image, the correspondence table of 8×8 pixels are repeatedly assigned for executing the N-value conversion processing. Here, the arrangements of the pattern groups A to D of the correspondence table 600 are offset for an adjacent 8×8 area. Further, the mask patterns are also offset according to the arrangement of the correspondence table 600. Further, in this case, the complementary relationship for performing division for multiple print heads 26 that eject ink of the same color also needs to be with mask patterns for which the corresponding pixels in repeated 1200-dpi 16×16 pixels are taken into consideration.

As described above, in the present embodiment, the print control part 38 functions as a print data generation part that generates print data for each of the nozzle groups that eject ink of the same color by use of different mask patterns in which whether printing of a dot is allowed or not allowed is defined for each pixel corresponding the printing resolution.

As explained above, in the printing apparatus 10, for generating print data for print heads corresponding to nozzle groups that perform printing with ink of the same color, N-valued data is separately generated for each print head from multi-value quantization data by use of different distribution patterns. Further, each N-valued data is thinned out by use of a corresponding mask pattern, in order to generate print data. Here, each mask pattern is such a pattern with which dots to be printed are not exclusively divided and with which the tone values of the multi-value quantization data are maintained in the output image.

Accordingly, in a case where printing is performed by multiple nozzle groups that eject ink of the same color, even if the printing positions of the nozzle groups are misaligned, the density variation in the output image caused by the misalignment is suppressed. Therefore, it is possible to suppress the occurrence of image failures such as density unevenness in the output image.

Further, in the printing apparatus 10, the N-valued data for each nozzle group is generated after the multi-value quantization data is generated, so that, compared to Japanese Patent Laid-Open No. 2012-144052 in which multi-value quantization data is generated for each nozzle group in order to create print data, the data amount can be suppressed.

Second Embodiment

Next, with reference to FIG. 15 and FIG. 16, an explanation will be given of a printing apparatus including the image processing apparatus according to the second embodiment. Note that, in the following explanation, the same or corresponding configurations as those of the first embodiment described above are assigned with the same signs as those used in the first embodiment, so as to omit detailed explanations thereof.

The second embodiment is different from the above-described first embodiment in that multiple print heads that eject ink of the same color are arranged so as to be displaced in the sub-scanning direction in a partially-overlapping manner. That is, in the above-described first embodiment, the explanation is given of a case in which the multiple print heads 26 that eject ink of the same color are arranged at such positions that match in the sub-scanning direction so that printing is performed in the same area by one scan of the print heads 26. In the second embodiment, an explanation will be given of a case in which multiple print heads 26 that eject ink of the same color are arranged at such positions that are displaced in the sub-scanning direction in a partially-overlapping manner so that printing is performed in a unit area by multiple times of scans.

Figure 15:
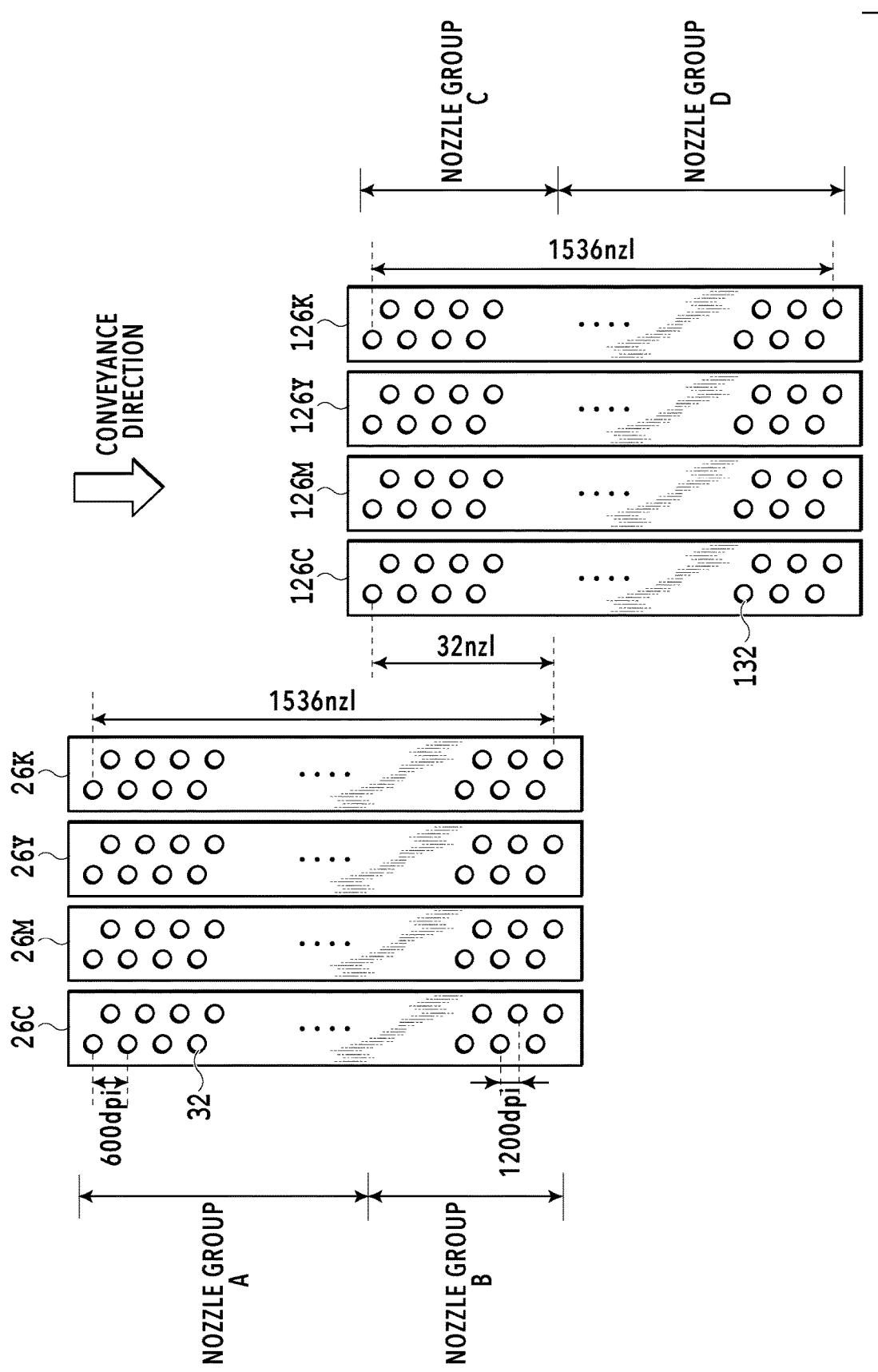
FIG. 15 is a diagram illustrating an example of an arrangement of print heads in the second embodiment.
Figure 16:
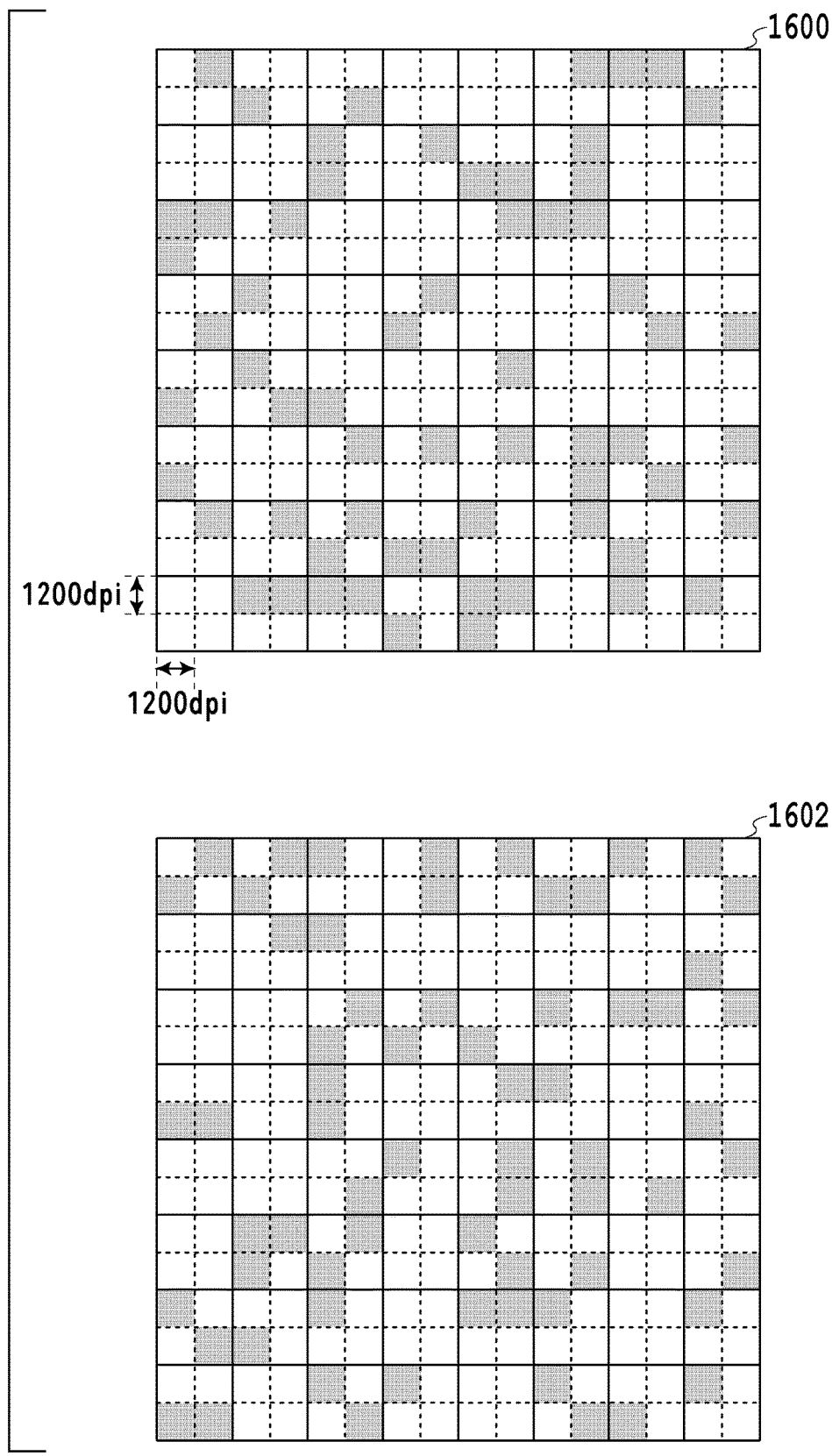
FIG. 16 is a diagram illustrating a flowchart to be used for a nozzle group that prints an overlapping area during scanning.

FIG. 15 is a diagram for explaining the arrangement positions of print heads 26 disposed on the carriage 20. The printing apparatus 10 including the image processing apparatus according to the second embodiment includes a print head 26 and a print head 126 that is arranged so as to be displaced relative to the print head 26 in the sub-scanning direction. The print head 26 includes a print head 26C, a print head 26M, a print head 26Y, and a print head 26K that are arranged side by side along the main-scanning direction. The print heads 26C, 26M, 26Y, and 26K are arranged at positions that match in the sub-scanning direction. Further, the print head 126 includes a print head 126C that ejects C ink, a print head 126M that ejects M ink, a print head 126Y that ejects Y ink, and a print head 126K that ejects K ink. The print heads 126C, 126M, 126Y, and 126K are arranged side by side along the main-scanning direction and are arranged at positions that match in the sub-scanning direction.

In the print head 126, as with the print head 26, 1536 nozzles 132 for ejecting ink droplets are formed at intervals of 600 dpi along the sub-scanning direction in two rows. Moreover, these two nozzle rows are formed so that, relative to one nozzle row, the other nozzle row is displaced by 1200 dpi in the sub-scanning direction. Further, relative to the print head 26, the print head 126 is arranged so as to be displaced in the sub-scanning direction so that 32 nozzles 132 overlap in the sub-scanning direction. Therefore, in the present embodiment, as for each color, it is possible to perform printing in an area corresponding to a maximum of 3040 nozzles in one scan.

In the printing apparatus 10 having such a configuration as described above, for example, for each scan, conveyance by half the length of the nozzle groups formed with the nozzles 32 and 132 of the print heads 26 and 126 is performed, so that printing is performed in a unit area corresponding to one band in two times of scans. In this case, in a unit area corresponding to one band, the first printing is performed by the 1520 nozzles of the nozzle groups in the upstream of the conveyance direction, and the second printing is performed by the 1520 nozzles of the nozzle groups in the downstream of the conveyance direction.

Here, the 1504 nozzles 32 of the print head 26 in the upstream of the conveyance direction are referred to as the nozzle group A, and the 32 nozzles 32 of the print head 26 in the downstream of the conveyance direction are referred to as the nozzle group B. Further, the 32 nozzles 132 of the print head 126 in the upstream of the conveyance direction are referred to as the nozzle group C, and the 1504 nozzles 132 of the print head 126 in the downstream of the conveyance direction are referred to as the nozzle group D. Here, in a case where printing is performed in two times of scans as described above, the following three combinations of data distribution among the nozzle groups in the print heads 26 and 126 are possible. The first combination is a case in which printing is performed with the nozzle group A in the first scan and printing is performed with the nozzle group D in the second scan. The second combination is a case in which printing is performed with the nozzle group A in the first scan and printing is performed with the nozzle group B and the nozzle group C in the second scan. The third combination is a case in which printing is performed with the nozzle group B and the nozzle group C in the first scan and printing is performed with the nozzle group D in the second scan.

The first combination is a simple two-pass printing, in which the print data is generated by performing thinning-out process by use of mask patterns so as to mutually complement the pixels to be printed by the nozzle groups A and D whose printing areas do not overlap in scanning. On the other hand, in the second and third combinations, it is necessary that the data is divided by use of mask patterns so that printing is performed in two times of scans and, in the area where the two nozzle groups B and C overlap, the data is divided for the two nozzle groups.

In this case, if the printing positions of the nozzle groups B and C are misaligned, the ratio of the blank area in the area where printing is performed by the nozzle groups B and C is increased, which causes density unevenness. Therefore, for generating print data, it is necessary that the mask patterns corresponding to the area where printing is performed by the nozzle groups B and C are such patterns with which complement of the print data between the nozzle groups B and C is possible.

In the printing apparatus 10 including the image processing apparatus according to the second embodiment, the N-valued data is thinned out by use of mask patterns corresponding to the respective nozzle groups in S1014 of the image data processing according to the above-described present embodiment. Specifically, for example, for the area where printing is performed by the nozzle group A, the N-valued data corresponding to the print head 26 is thinned out by use of the mask pattern 800, and, for the area where printing is performed by the nozzle group D, the N-valued data corresponding to the print head 126 is thinned out by use of the mask pattern 802. Further, for the nozzle groups B and C, the N-valued data for the print heads 26 and 126 is thinned out by use of the mask patterns 1600 and 1602 (described later), which are based on the mask pattern 800, or by use of mask patterns (not illustrated in the drawings) that are based on the mask pattern 802.

Here, an explanation will be given of the mask patterns used for the nozzle groups whose printing areas overlap. In the following explanation, a case in which printing is performed by the nozzle groups B and C in the first scan and printing is performed by the nozzle group D in the second scan will be explained as an example. The mask patterns for determining the pixels to be printed in the first scan with the nozzle groups B and C are created based on the mask pattern 800. Further, the mask patterns for determining the pixels to be printed in the second scan with the nozzle group D is created based on the mask pattern 802. FIG. 16 is a diagram illustrating mask patterns 1600 and 1602 to be used for the nozzle groups B and C, whose printing areas overlap in the printing pixels of the first scan, that is, in the pixels to be printed by use of the mask pattern 800.

The mask pattern 1600 is a pattern obtained by thinning out printing pixels from the mask pattern 800, based on the division ratio between the nozzle groups B and C. On the other hand, the mask pattern 1602 is obtained by applying a mask with pixel positions that complement each other between the distribution patterns group Gr1 and group Gr2 to the difference (thinned-out pixels) between the mask pattern 800 and the mask pattern 1600. Note that, as for the division ratio, it is possible that the distribution is evenly performed or it is also possible that the ratio of either one of printing is higher than the other. Further, it is also possible that the ratio is changed stepwise in the conveyance direction.

Accordingly, the printing pixels obtained by masking the N-valued data of the print head 26 by use of the mask pattern 1600 and the printing pixels obtained by masking the N-valued data of the print head 126 by use of the mask pattern 1602 are in a mutually complementary relationship. Further, if complemented with the data printed by the nozzle group D in the second scan by masking the N-valued data of the print head 126 by use of the mask pattern 802, the tone value (M=3 for each of the 600-dpi pixels) at the resolution of the multi-value quantization data is maintained.

Although not illustrated in drawings, one of the mask patterns for determining the pixels to be printed by the nozzle groups B and C in the second scan is a pattern obtained by thinning out the mask pattern 802, based on the above-described division ratio. Further, the other mask pattern is obtained by applying a mask with pixel positions that complement each other between the distribution patterns group Gr1 and group Gr2 to the difference between the one mask pattern and the mask pattern 802.

As explained above, in the printing apparatus including the image processing apparatus according to the second embodiment, the print heads 26 and 126 are arranged at positions displaced in the sub-scanning direction in a partially-overlapping manner so that printing is performed in multi-pass printing. Further, mask patterns corresponding to nozzle groups are applied to the N-valued data corresponding to the print heads 26 and 126. In particular, for the nozzle groups B and C in the area where the print heads 26 and 126 overlap in the sub-scanning direction, mask patterns obtained by thinning based on the division ratio between the nozzle groups B and C are used as the mask patterns for determining the printing pixels in scanning. Further, as the above-described mask patterns, masks having pixels whose positions are complementary to each other between the distribution pattern groups Gr1 and Gr2 are used.

Accordingly, the tone values of the multi-value quantization data are maintained, and, even in a case where misalignment occurs for the nozzle groups with an overlapping printing area, the density variation in the output image caused by the misalignment is suppressed.

OTHER EMBODIMENTS

Note that the above-described embodiments may be modified as shown in the following (1) through (5).

(1) Although not particularly described in the above-described embodiments, for example, in a part corresponding to a bright part of the printed image, the patterns to be set based on the respective distribution patterns can match each other. The details will be explained below.

Here, in the above-described embodiments, as illustrated in FIG. 6B and FIG. 6C, in the arrangements of the distribution patterns group Gr1 and group Gr2, the patterns are different from each other in the tone values of M=1 to 3. Therefore, N-valued data is generated based on different patterns for the multiple nozzle groups. Further, for each nozzle group, distribution of pixels in which a dot distributed based on the multi-value quantization data is formed is changed depending on the mask patterns. Therefore, in a case of the present embodiment, as compared to such a case in which the same distribution pattern is used as in the comparative example, there is a possibility that the dispersibility of the dot arrangement in a bright part of the output image is particularly decreased, which causes deterioration in the graininess.

In order not to cause such a decrease in the dispersibility of the dot arrangement in a bright part, such distribution patterns that the patterns of a tone value in which graininess will be conspicuous match each other are used. Accordingly, the graininess is maintained without decrease in the dispersibility of the multi-value quantization data. Note that, as for such distribution patterns, by making patterns different from each other as in the above-described embodiments in a tone value in which density unevenness will be conspicuous, the density unevenness caused by misalignment of printing positions is reduced. Accordingly, it is possible to maintain the graininess and reduce the density unevenness at the same time.

Figures 17A, 17B:
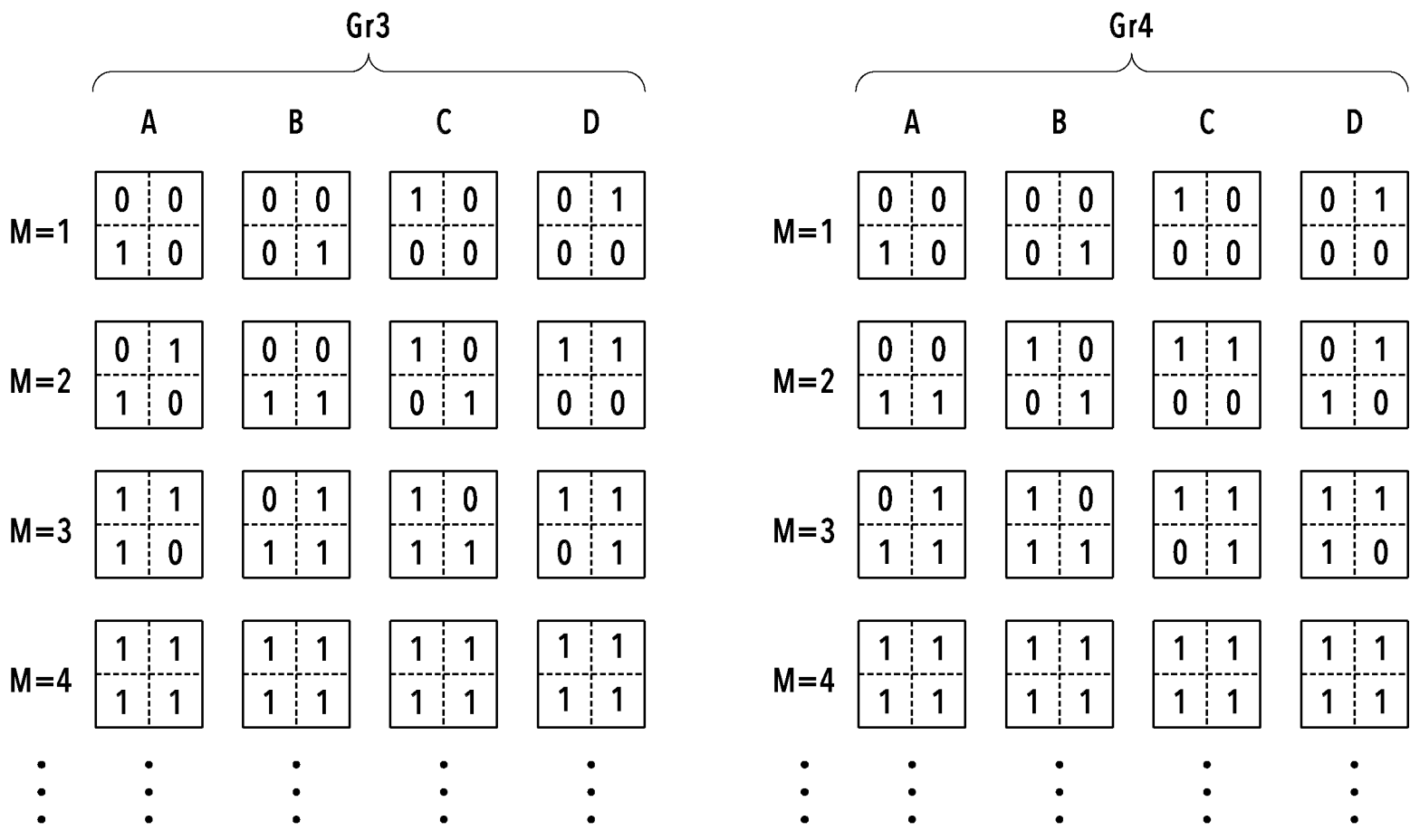

FIG. 17A and FIG. 17B are diagrams illustrating a modification example of the distribution patterns. FIG. 17A is a diagram illustrating an example of a group Gr3 of the distribution pattern, and FIG. 17B is a diagram illustrating an example of a group Gr4 of the distribution pattern. For example, for application to the first embodiment in generation of the N-valued data, with respect to the multi-value quantization data, the distribution pattern of the group Gr3 is used for the print head 26K1, and the distribution pattern of the group Gr4 is used for the print head 26K2.

Since the tone value M=1 represents a bright part in the output image, the corresponding patterns in the groups Gr3 and Gr4 are the same as each other. On the other hand, since the density unevenness is likely to be conspicuous in the tone values M=2 and 3 of the output image, the corresponding patterns are different from each other.

Therefore, in the pixels of M=1, the N-valued data is generated by use of the same pattern for both of the print heads 26K1 and 26K2 and then thinned out by use of mask patterns for generating print data. Here, the mask patterns are such patterns with which dots are exclusively divided into the respective print heads in the part corresponding to the pixels of M=1. Accordingly, in the pixels of M=1, which represent a bright part in the output image, the dispersibility of the dot arrangement is not decreased, and the decrease in graininess is suppressed.

On the other hand, in the pixels of M=2 or higher, the N-valued data is generated by use of patterns that are different from each other for the print heads 26K1 and 26K2 and then thinned out by use of mask patterns for generating print data. Here, the mask patterns for the pixels of M=2 or higher are such patterns as limited in the above-described first embodiment. Accordingly, in the pixels of M=2 or higher of the output image, the density variation caused by misalignment of the printing positions of the print heads is reduced while the tone values in the multi-value quantization data are maintained.

Note that, in the above-described explanation, the ratio for making the distribution patterns different are simply changed according to the tone values of the multi-value quantization data, graininess and conspicuousness of density unevenness differ depending on ink colors. Therefore, the ratio for making patterns in the distribution patterns different are changed according to ink colors. That is, patterns with a tone value less than a predetermined value are made to match each other in the respective distribution patterns according to ink colors.

(2) Although not particularly described in the above-described embodiments, in a case where a tone value of the multi-value quantization data is M=5 or higher, it is possible to use such mask patterns with which the numbers of dots to be printed by the respective print heads (nozzle groups) are uniformized for the respective pixels.

In the distribution patterns, patterns whose tone value is M=5 or higher have a pixel in which two or more dots are formed. Regarding this pixel, in a case where the mask patterns 1200 and 1202 shown in the above-described embodiment are simply used, there is a possibility that pixels not to be printed or pixels to be printed in an overlapping manner are generated. Specifically, for example, in the mask patterns 1200 and 1202, the leftmost pixel (in a unit of 1200 dpi) in the uppermost row is not printed. On the other hand, in the second pixel from the leftmost and uppermost row, printing is performed by both of the nozzle groups. In such a case, the micro density difference between the pixel without dots and the pixel on which two dots are printed becomes large, so that the graininess is deteriorated.

In order not to cause such deterioration in graininess, the numbers of dots to be printed are uniformized for the respective pixels by use of the mask patterns 1200 and 1202. Hereinafter, with reference to FIG. 18A to FIG. 20C, a detailed explanation is given of a method for uniformizing the numbers of dots to be printed for the respective pixels by use of the mask patterns 1200 and 1202.

Figures 18A, 18B, 18C, 18D:
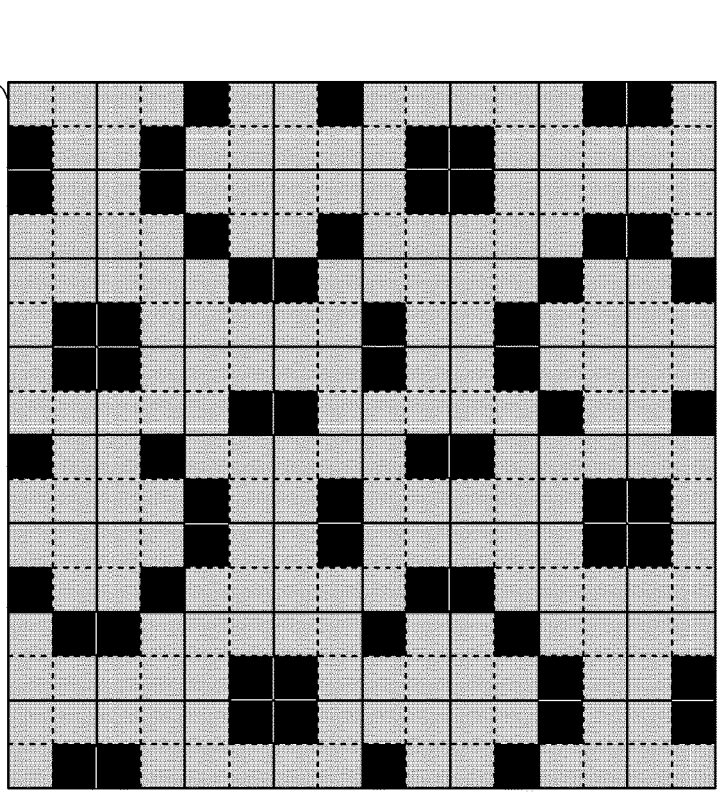
FIG. 18A to FIG. 18D are diagrams illustrating distribution patterns and N-valued data obtained by performing N-value conversion processing with the distribution patterns.
Figure 19:
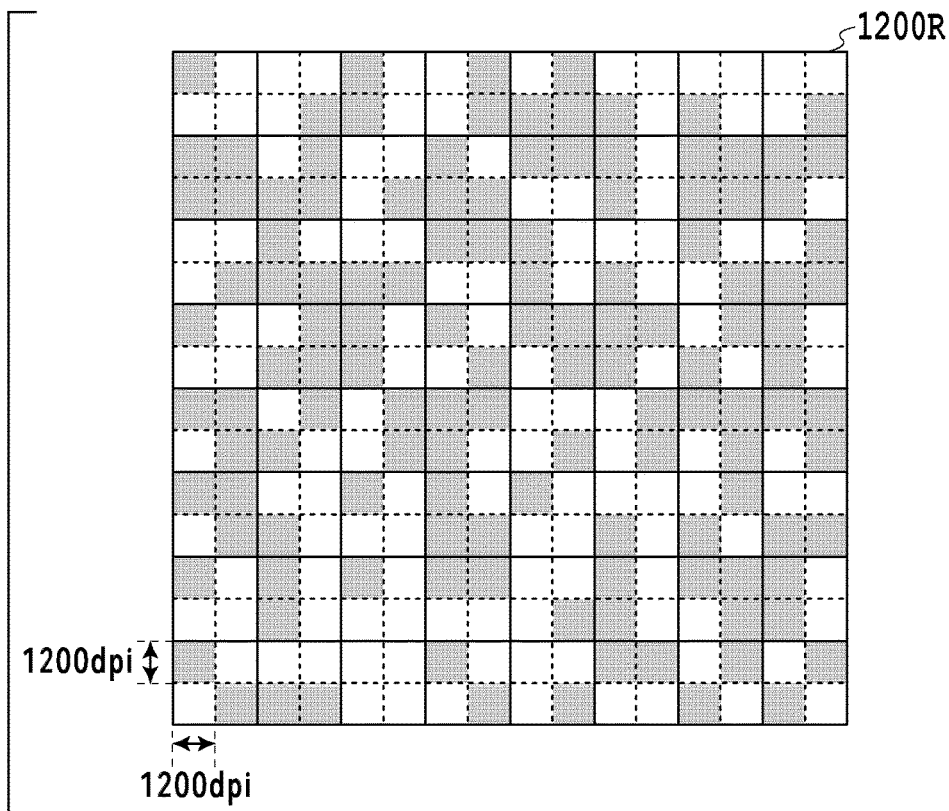
FIG. 19 is a diagram illustrating mask patterns used for the second dots.
Figure 19:
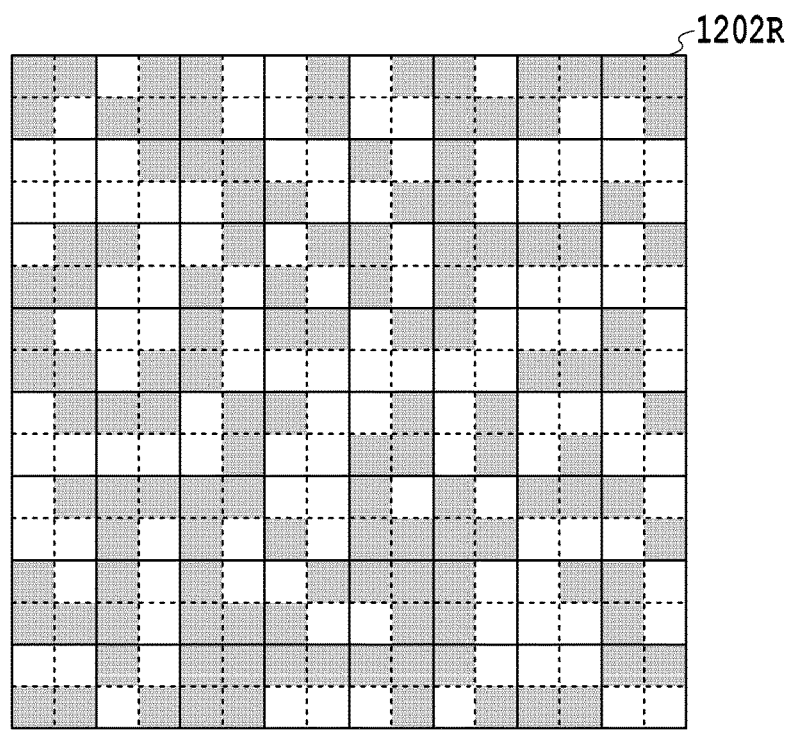
Figure 20A:
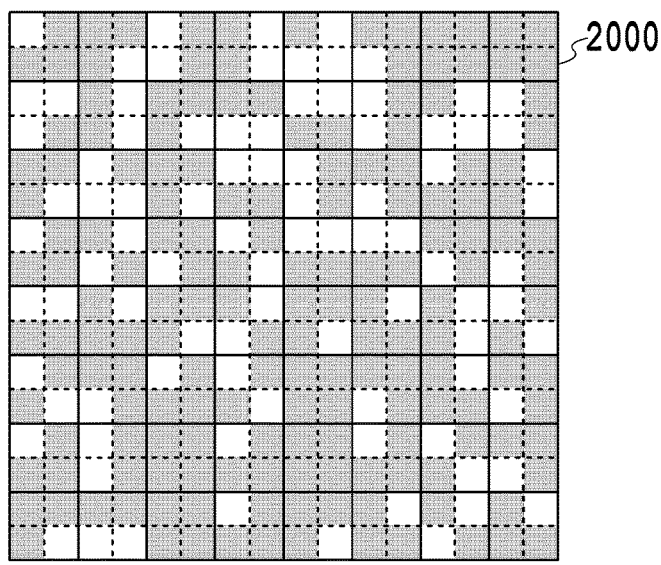
FIG. 20A to FIG. 20C are diagrams illustrating print data for print heads and a printed output image.
Figure 20B:
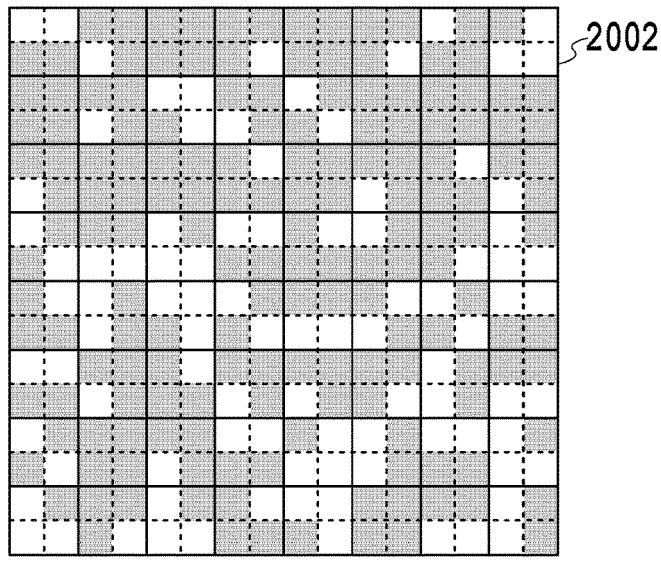
Figure 20C:
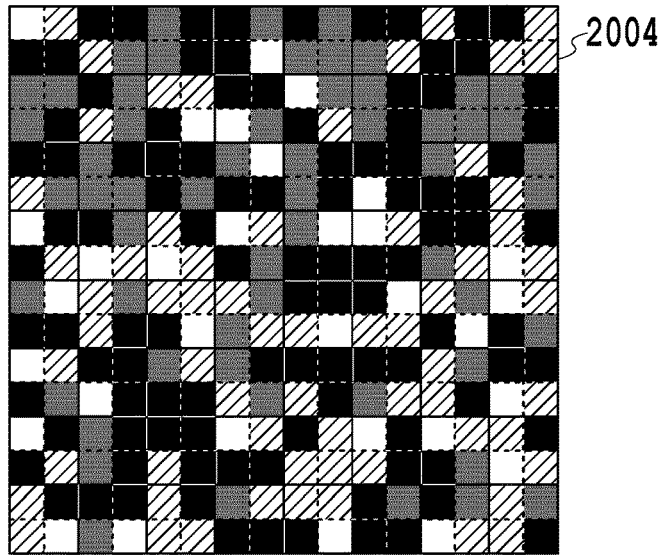

FIG. 18A is a diagram illustrating an example of a group Gr5 showing a distribution pattern for which patterns of tone value M=5 are set, and FIG. 18B is a diagram illustrating an example of a group Gr6 showing a distribution pattern for which patterns of tone value M=5 are set. FIG. 18C is N-valued data 1800 according to the distribution pattern of the group Gr5. FIG. 18D is N-valued data 1802 according to the distribution pattern of the group Gr6. FIG. 19 is a diagram illustrating mask patterns to be used for the second dots. FIG. 20A is a diagram illustrating print data generated for the print head 26K1. FIG. 20B is a diagram illustrating print data generated for the print head 26K2. FIG. 20C is a diagram illustrating an output image printed based on the print data of FIG. 20A and FIG. 20B.

By use of the distribution patterns group Gr5 and group Gr6, the N-valued data 1800 is provided for the print head 26K1, and the N-valued data 1802 is provided for the print head 26K2. First, the first dots of the N-valued data 1800 and 1802 are thinned out by use of the mask patterns 1200 and 1202. Since the first dot is present in all the pixels, the patterns thinned out by use of the mask patterns 1200 and 1202 are the same pattern as the mask patterns 1200 and 1202.

Next, the second dots are thinned out by use of the mask patterns 1200R and 1202R (see FIG. 19) in which the printing pixels and non-printing pixels of the mask patterns 1200 and 1202 are inverted. The second dot is present in the black pixels of the N-valued data 1800 and 1802. Such a pattern with only the second dots are thinned out by use of the mask patterns 1200R and 1202R. In the data obtained in this process, a dot is added to pixels in which printing of the first dot is not performed.

Further, from the data obtained by thinning out the first dots and the data obtained by thinning out the second dots, the print data 2000 illustrated in FIG. 20A is generated for the print head 26K1, and the print data 2002 illustrated in FIG. 20B is generated for the print head 26K2. The output image based on these print data is an output image 2004 as illustrated in FIG. 20C. In this output image 2004, 0 to 2 dots are arranged in each pixel (1200 dpi).

The same applies to M=6 or higher. In a case of M=8, if data of the second dots is arranged in the patterns so that each tone value after the N-value conversion processing becomes "2", one dot each is printed by the two nozzle groups in each pixel of the output image of M=8. In this way, division is performed for the N-valued data with which the second dots are printed in the respective pixels at the printing resolution by use of mask patterns in which the printing pixels and non-printing pixels of the mask patterns used for the first dots are inverted. Accordingly, the numbers of dots to be printed by the respective print heads (nozzle groups) are uniformized for the respective pixels, and, even in a case where the printing positions of the print heads (nozzle groups) are misaligned, the density variation caused by the misalignment can be suppressed.

(3) Although the print data is generated by processing image data with the host PC 36 and the printing apparatus 10 in the present embodiments, the present embodiments are not limited as such. That is, for example, it is also possible to make a general-purpose personal computer or the like function as an image processing apparatus, so as to generate print data from an image data according to the above-described embodiments. In this case, it is also possible that the image processing apparatus is connected to a printing unit such as a print head, so as to configure the printing apparatus. Further, although the print head 26 is configured to move in the X direction via the carriage 20 relative to the print medium M conveyed in the Y direction in the present embodiments, the present embodiments are not limited as such. That is, any configuration may be possible as long as the print medium M and the print head 26 are relatively movable.

(4) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(5) The above-described embodiments and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-068219, filed Apr. 6, 2020, which is hereby incorporated by reference wherein in its entirety.

What is claimed is:

1. An image processing apparatus for processing generating print data used for printing an image in a unit area of a print medium by relatively movement between the print medium and each of a first nozzle group and a second nozzle group for ejecting ink of a same color, the image processing apparatus comprising:
   an obtainment unit configured to obtain multi-valued data, which corresponds to ink for printing the image and indicates a value of each pixel with a tone value;
   a quantization data generation unit configured to define an arrangement of a plurality of dots corresponding to a tone value of a pixel for each pixel in the multi-valued data, in order to generate first quantization data, which corresponds to a greater pixel count than the multi-valued data and is used for printing by the first nozzle group, and configured to define an arrangement of the plurality of dots corresponding to a tone value of a pixel for each pixel in the multi-valued data so as to be different from the arrangement of dots indicated by the first quantization data, in order to generate second quantization data, which corresponds to a greater pixel count than the multi-valued data and is used for printing by the second nozzle group; and
   a print data generation unit configured to generate first print data for printing the unit area with the first nozzle group, based on the first quantization data, by use of a first mask pattern in which whether printing of a dot is allowed or not allowed is defined for each pixel of the first quantization data and configured to generate second print data for printing the unit area with the second nozzle group, based on the second quantization data, by use of a second mask pattern in which whether printing of a dot is allowed or not allowed is defined for each pixel of the second quantization data,
   wherein the first mask pattern and the second mask pattern are formed for quantization data corresponding to the unit area so as to include a pixel for which printing of a dot is allowed in both of the first mask pattern and the second mask pattern and a pixel for which printing of a dot is not allowed in both of the first mask pattern and the second mask pattern, and
   wherein a sum of a number of dots indicated by the first print data and a number of dots indicated by the second print data in an area corresponding to each pixel in the multi-valued data has a correlation with a pixel value of each pixel indicated by the multi-valued data.

2. The image processing apparatus according to claim 1, wherein a first distribution pattern, which defines arrangements of a plurality of dots according to a tone value of a pixel for each pixel in the multi-valued data so as to generate the first quantization data, and a second distribution pattern, which defines arrangements of a plurality of dots according to a tone value of a pixel for each pixel in the multi-valued data so as to generate the second quantization data, have patterns according to a pixel value of a pixel in the multi-valued data,
   wherein the patterns associated with each pixel indicated by the multi-valued data according to the first distribution pattern and the second distribution pattern are determined according to a table and a pixel value, and
   wherein the table is offset so that a same pattern is not repeated in adjacent pixels of the respective pixels in the multi-valued data.

3. The image processing apparatus according to claim 2, wherein the first distribution pattern and the second distribution pattern match in a pattern whose pixel value of a pixel in the multi-valued data is lower than a predetermined value, and wherein, in the first distribution pattern and the second distribution pattern, whether printing of a dot in the pixel is allowed or not allowed is exclusively divided.

4. The image processing apparatus according to claim 3, wherein the predetermined value differs according to a type of ink to be ejected from the first nozzle group and the second nozzle group.

5. The image processing apparatus according to claim 1, wherein the print data generation unit uniformizes a dot number to be printed based on the first print data and the second print data, the dot number being uniformized by use of the first mask pattern and the second mask pattern in a case where a pixel value of a pixel in the first quantization data and the second quantization data is 2 or higher.

6. The image processing apparatus according to claim 1, wherein, in a case where a pixel value in the first quantization data and the second quantization data is 2, the print data generation unit uses the first mask pattern and the second mask pattern for first dots in pixels of the multi-valued data including the pixel and, for second dots, the print data generation unit uses mask patterns in which whether printing of a dot is allowed or not allowed for the first mask pattern and the second mask pattern is inverted.

7. The image processing apparatus according to claim 1, further comprising
a print head configured to perform movement relative to the print medium and configured to print the image on the print medium by use of the first nozzle group and the second nozzle group, based on the first print data and the second print data.

8. The image processing apparatus according to claim 7, wherein, in the print head, the first nozzle group and the second nozzle group are arranged so as not to be displaced from each other in an array direction of nozzles in the first nozzle group and the second nozzle group.

9. The image processing apparatus according to claim 7, wherein, in the print head, the first nozzle group and the second nozzle group are arranged so as to be displaced in a partially-overlapping manner in an array direction of nozzles in the first nozzle group and the second nozzle group.

10. An image processing method for processing generating print data used for printing an image in a unit area of a print medium by relatively movement between the print medium and each of a first nozzle group and a second nozzle group for ejecting ink of a same color, the image processing method comprising:
an obtainment step of obtaining multi-valued data, which corresponds to ink for printing the image and indicates a value of each pixel with a tone value;
a quantization data generation step of defining an arrangement of a plurality of dots corresponding to a tone value of a pixel for each pixel in the multi-valued data, in order to generate first quantization data, which corresponds to a greater pixel count than the multi-valued data and is used for printing by the first nozzle group, and for defining an arrangement of the plurality of dots corresponding to a tone value of a pixel for each pixel in the multi-valued data so as to be different from the arrangement of dots indicated by the first quantization data, in order to generate second quantization data, which corresponds to a greater pixel count than the multi-valued data and is used for printing by the second nozzle group; and a print data generation step of generating first print data for printing the unit area with the first nozzle group, based on the first quantization data, by use of a first mask pattern in which whether printing of a dot is allowed or not allowed is defined for each pixel of the first quantization data and for generating second print data for printing the unit area with the second nozzle group, based on the second quantization data, by use of a second mask pattern in which whether printing of a dot is allowed or not allowed is defined for each pixel of the second quantization data,
wherein the first mask pattern and the second mask pattern are formed for quantization data corresponding to the unit area so as to include a pixel for which printing of a dot is allowed in both of the first mask pattern and the second mask pattern and a pixel for which printing of a dot is not allowed in both of the first mask pattern and the second mask pattern, and
wherein a sum of a number of dots indicated by the first print data and a number of dots indicated by the second print data in an area corresponding to each pixel in the multi-valued data has a correlation with a pixel value of each pixel indicated by the multi-valued date.

11. The image processing method according to claim 10, wherein a first distribution pattern, which defines arrangements of a plurality of dots according to a tone value of a pixel for each pixel in the multi-valued data so as to generate the first quantization data, and a second distribution pattern, which defines arrangements of a plurality of dots according to a tone value of a pixel for each pixel in the multi-valued data so as to generate the second quantization data, have patterns according to a pixel value of a pixel in the multi-valued data,
wherein the patterns associated with each pixel indicated by the multi-valued data according to the first distribution pattern and the second distribution pattern are determined according to a table and a pixel value, and
wherein the table is offset so that a same pattern is not repeated in adjacent pixels of the respective pixels in the multi-valued data.

12. The image processing method according to claim 11, wherein the first distribution pattern and the second distribution pattern match in a pattern whose pixel value of a pixel in the multi-valued data is lower than a predetermined value, and
wherein, in the first distribution pattern and the second distribution pattern, whether printing of a dot in the pixel is allowed or not allowed is exclusively divided.

13. The image processing method according to claim 12, wherein the predetermined value differs according to a type of ink to be ejected from the first nozzle group and the second nozzle group.

14. The image processing method according to claim 10, wherein in the print data generation step, a dot number to be printed based on the first print data and the second print data is uniformized by use of the first mask pattern and the second mask pattern in a case where a pixel value of a pixel in the first quantization data and the second quantization data is 2 or higher.

15. The image processing method according to claim 10, wherein, in a case where a pixel value in the first quantization data and the second quantization data is 2, in the print data generation step, the first mask pattern and the second mask pattern are used for first dots in pixels of the multi-valued data including the pixel and, for second dots, in the print data generation step, mask patterns in which whether printing of a dot is allowed or not allowed for the first mask pattern and the second mask pattern is inverted are used.

16. The image processing method according to claim 10, further comprising
a print step of moving a print head having the first nozzle group and the second nozzle group relative to the print medium, and printing the image on the print medium by use of the first nozzle group and the second nozzle group, based on the first print data and the second print data.

17. The image processing method according to claim 16, wherein, in the print head, the first nozzle group and the second nozzle group are arranged so as not to be displaced from each other in an array direction of nozzles in the first nozzle group and the second nozzle group.

18. The image processing method according to claim 16, wherein, in the print head, the first nozzle group and the second nozzle group are arranged so as to be displaced in a partially-overlapping manner in an array direction of nozzles in the first nozzle group and the second nozzle group.

19. A non-transitory computer readable storage medium storing a program for causing a computer to function as an image processing apparatus for processing generating print date used for printing an image in a unit area of a print medium by relatively movement between the print medium and each of a first nozzle group and a second nozzle group for ejecting ink of a same color, the image processing apparatus comprising:
an obtainment unit configured to obtain multi-valued data, which corresponds to ink for printing the image and indicates a value of each pixel with a tone value;
a quantization data generation unit configured to define an arrangement of a plurality of dots corresponding to a tone value of a pixel for each pixel in the multi-valued data, in order to generate first quantization data, which corresponds to a greater pixel count than the multi-valued data and is used for printing by the first nozzle group, and configured to define an arrangement of the plurality of dots corresponding to a tone value of a pixel for each pixel in the multi-valued data so as to be different from the arrangement of dots indicated by the first quantization data, in order to generate second quantization data, which corresponds to a greater pixel count than the multi-valued data and is used for printing by the second nozzle group; and
a print data generation unit configured to generate first print data for printing the unit area with the first nozzle group, based on the first quantization data, by use of a first mask pattern in which whether printing of a dot is allowed or not allowed is defined for each pixel of the first quantization data and configured to generate second print data for printing the unit area with the second nozzle group, based on the second quantization data, by use of a second mask pattern in which whether printing of a dot is allowed or not allowed is defined for each pixel of the second quantization data,
wherein the first mask pattern and the second mask pattern are formed for quantization data corresponding to the unit area so as to include a pixel for which printing of a dot is allowed in both of the first mask pattern and the second mask pattern and a pixel for which printing of a dot is not allowed in both of the first mask pattern and the second mask pattern, and
wherein a sum of a number of dots indicated by the first print data and a number of dots indicated by the second print data in an area corresponding to each pixel in the multi-valued data has a correlation with a pixel value of each pixel indicated by the multi-valued data.

* * * * *